United States Patent
Frenne et al.

(10) Patent No.: US 12,446,027 B2
(45) Date of Patent: Oct. 14, 2025

(54) PUSCH RESOURCE ALLOCATION WITH MULTIPLE TRPS

(71) Applicant: Telefonaktiebolaget LM Ericsson (publ), Stockholm (SE)

(72) Inventors: Mattias Frenne, Uppsala (SE); Shiwei Gao, Nepean (CA); Siva Muruganathan, Stittsville (CA); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 17/915,169

(22) PCT Filed: Apr. 1, 2021

(86) PCT No.: PCT/IB2021/052751
§ 371 (c)(1),
(2) Date: Sep. 28, 2022

(87) PCT Pub. No.: WO2021/198982
PCT Pub. Date: Oct. 7, 2021

(65) Prior Publication Data
US 2023/0124582 A1    Apr. 20, 2023

Related U.S. Application Data

(60) Provisional application No. 63/003,695, filed on Apr. 1, 2020.

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04L 5/0012* (2013.01); *H04W 72/23* (2023.01)

(58) Field of Classification Search
CPC .. H04L 5/0012; H04W 72/23; H04W 72/1268
(Continued)

(56) References Cited

U.S. PATENT DOCUMENTS

| 2019/0149365 | A1 | 5/2019 | Chatterjee et al. |
| 2020/0007296 | A1 | 1/2020 | Papasakellariou |
| 2022/0330308 | A1* | 10/2022 | Ly ............... H04W 72/535 |

FOREIGN PATENT DOCUMENTS

| CN | 110380834 A | 10/2019 |
| CN | 110475360 A | 11/2019 |

(Continued)

OTHER PUBLICATIONS

Author Unknown, "Technical Specification Group Radio Access Network; NR; Physical layer procedures for control (Release 16)," Technical Specification 38.213, Version 16.0.0, Dec. 2019, 3GPP Organizational Partners, 146 pages.

(Continued)

*Primary Examiner* — Peter G Solinsky
(74) *Attorney, Agent, or Firm* — Withrow & Terranova, PLLC

(57) ABSTRACT

Physical Uplink Shared Channel (PUSCH) resource allocation with multiple TRPs is provided. Embodiments described herein provide details to facilitate multi-Transmission/Reception Point (TRP) transmission on the PUSCH with respect to User Equipment (UE) implementation and application scenarios. A gap between consecutive PUSCH transmission instances toward different TRPs (e.g., transmission associated with different spatial transmission filters) can be signaled, either semi-statically or dynamically. In case of dynamic signaling, the gap may be configured in a Time Domain Resource Allocation (TDRA) table and indi- (Continued)

cated in Downlink Control Information (DCI). In case of semi-static signaling, it may be done by Radio Resource Control (RRC).

33 Claims, 11 Drawing Sheets

(58) Field of Classification Search
USPC .......................................................... 370/329
See application file for complete search history.

(56) References Cited

FOREIGN PATENT DOCUMENTS

| CN | 110710146 A | 1/2020 |
|---|---|---|
| CN | 110771235 A | 2/2020 |
| EP | 4118779 B1 | 7/2024 |

OTHER PUBLICATIONS

Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.
International Preliminary Report on Patentability for International Patent Application No. PCT/IB2021/052751, mailed Jun. 22, 2022, 47 pages.
Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 532 pages.
CATT, "R1-1910349: Considerations on multi-TRP/panel transmission," 3GPP TSG RAN WG1 #98bis, Oct. 14-20, 2019, Chongqing, China, 25 pages.
Ericsson, "R1-1909225: Enhancements to multibeam operation," 3GPP TSG-RAN WG1 Meeting #98, Aug. 26-30, 2019, Prague, Czech Republic, 23 pages.
Huawei, et al., "R1-1906029: Enhancements on Multi-TRP/panel transmission," 3GPP TSG RAN WG1 #97, May 13-17, 2019, Reno, Nevada, 17 pages.
Oppo, "R1-1912520: PUSCH enhancement for URLLC," 3GPP TSG RAN WG1 #99, Nov. 18-22, 2019, Reno, Nevada, 8 pages.
Panasonic, "R1-1910523: On multi-TRP enhancements for NR MIMO in Rel. 16," 3GPP TSG RAN WG1 #98bis, Oct. 14-20, 2019, Chongqing, China, 11 pages.
International Search Report and Written Opinion for International Patent Application No. PCT/IB2021/052751, mailed Jun. 22, 2021, 15 pages.
Written Opinion for International Patent Application No. PCT/IB2021/052751, mailed Mar. 16, 2022, 9 pages.
First Office Action for Chinese Patent Application No. 202180039567.8, mailed Feb. 24, 2025, 24 pages.
Examination Report for European Patent Application No. 21718206.2, mailed Mar. 27, 2025, 6 pages.
Notification to Grant for Chinese Patent Application No. 202180039567.8, mailed Aug. 1, 2025, 9 pages.

* cited by examiner

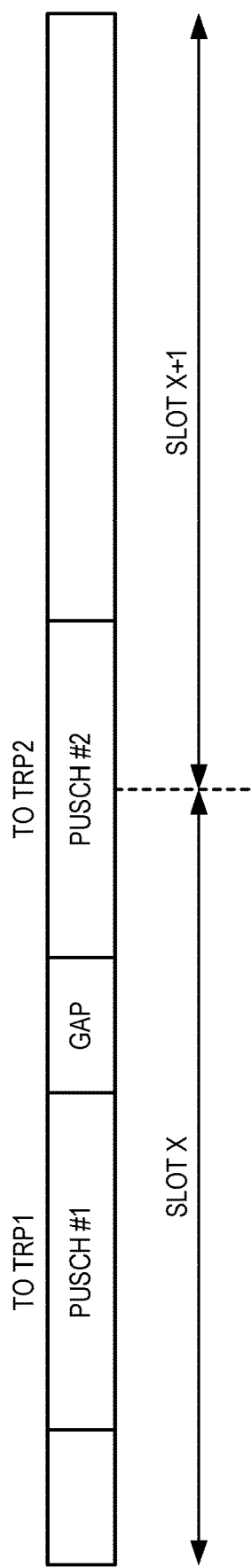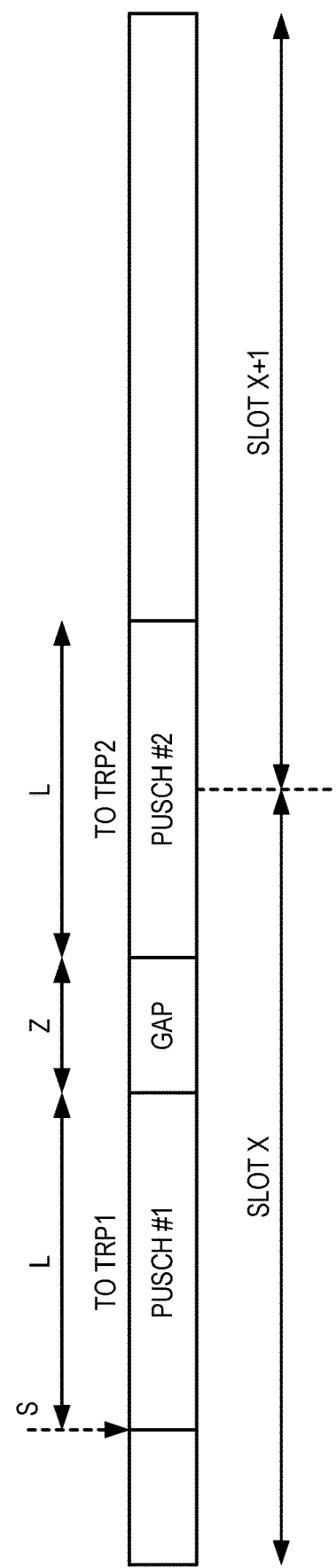

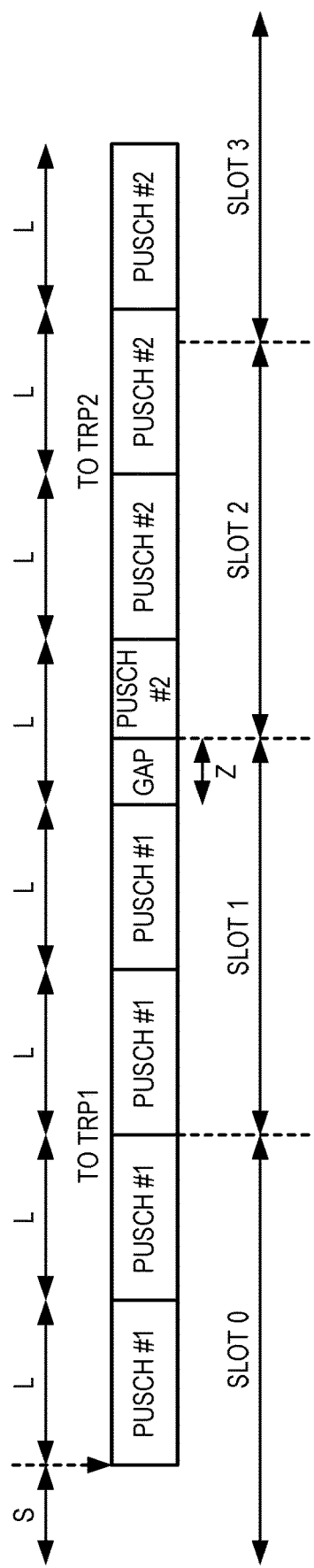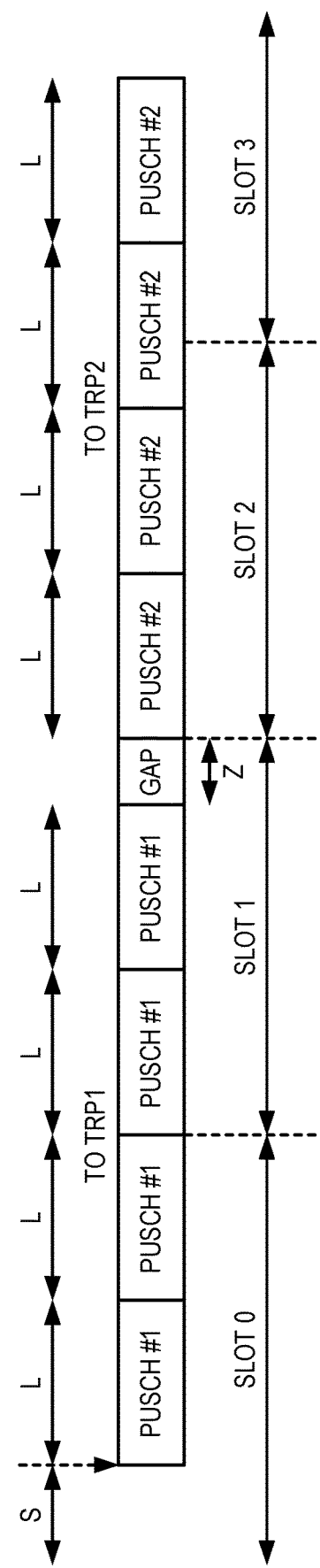
FIG. 6A
FIG. 6B

PUSCH RESOURCE ALLOCATION WITH MULTIPLE TRPS

RELATED APPLICATIONS

This application is a 35 U.S.C. § 371 national phase filing of International Application No. PCT/IB2021/052751, filed Apr. 1, 2021, which claims the benefit of provisional patent application Ser. No. 63/003,695, filed Apr. 1, 2020, the disclosures of which are hereby incorporated herein by reference in their entireties.

TECHNICAL FIELD

The present disclosure relates to shared channel resource allocation with multiple transmission/reception points (TRPs).

BACKGROUND

NR Frame Structure and Resource Grid

New Radio (NR) uses Cyclic Prefix Orthogonal Frequency Division Multiplexing (CP-OFDM) in both Downlink (DL) (e.g., from a network node, New Radio Base Station (gNB), or other base station, to a User Equipment (UE)) and Uplink (UL) (e.g., from UE to gNB). Discrete Fourier Transform (DFT) spread Orthogonal Frequency Division Multiplexing (OFDM) is also supported in the UL. In the time domain, NR DL and UL are organized into equally sized subframes of 1 millisecond (ms) each. A subframe is further divided into multiple slots of equal duration. The slot length depends on subcarrier spacing. For subcarrier spacing of $\Delta f=15$ kilohertz (kHz), there is only one slot per subframe, and each slot consists of 14 OFDM symbols.

FIG. 1 is a schematic block diagram of a time-domain structure for data scheduling in NR. Data scheduling in NR is typically on a slot basis, which is shown in FIG. 1 with a 14-symbol slot. The first two symbols contain a Physical DL Control Channel (PDCCH) and the rest contain a physical shared data channel, either Physical DL Shared Channel (PDSCH) or Physical UL Shared Channel (PUSCH).

Different subcarrier spacing values are supported in NR. The supported subcarrier spacing values (also referred to as different numerologies) are given by $\Delta f=(15 \times 2^\mu)$ kHz where $\mu \in \{0,1,2,3,4\}$. $\Delta f=15$ kHz is the basic subcarrier spacing. The slot durations at different subcarrier spacings are given by $1/2^\mu$ ms.

FIG. 2 is a schematic block diagram of a physical time-frequency resource grid for data scheduling in NR. In the frequency domain, a system bandwidth is divided into Resource Blocks (RBs), where each RB corresponds to 12 contiguous subcarriers. The RBs are numbered starting with 0 from one end of the system bandwidth. In the illustrated basic NR physical time-frequency resource grid only one RB within a 14-symbol slot is shown. One OFDM subcarrier during one OFDM symbol interval forms one Resource Element (RE).

In NR Release 15 (Rel-15), UL data transmissions can be dynamically scheduled using the PDCCH. A UE first decodes UL grants in the PDCCH and then transmits data over the PUSCH based on decoded control information in the UL grant such as modulation order, coding rate, UL resource allocation, etc.

In dynamic scheduling of PUSCH, there is also a possibility to configure semi-persistent transmission of a PUSCH using a Configured Grant (CG). There are two types of CG-based PUSCH defined in NR Rel-15. In CG type 1, a periodicity of PUSCH transmission as well as the time-domain offset are configured by Radio Resource Control (RRC). In CG type 2, a periodicity of PUSCH transmission is configured by RRC and then the activation and release of such transmission is controlled by DL Control Information (DCI) (e.g., with a PDCCH).

In NR, it is possible to schedule a PUSCH with time repetition, by the RRC parameter pusch-AggregationFactor (for dynamically scheduled PUSCH), and repK (for PUSCH with UL CG). In this case, the PUSCH is scheduled but transmitted in multiple adjacent slots (if the slot is available for UL) up until the number of repetitions as determined by the configured RRC parameter.

In the case of PUSCH with UL CG, the Redundancy Version (RV) sequence to be used is configured by the repK-RV field when repetitions are used. If repetitions are not used for PUSCH with UL CG, then the repK-RV field is absent.

In NR Rel-15, there are two mapping types supported, Type A and Type B, applicable to PDSCH and PUSCH transmissions. Type A is usually referred to as slot-based while Type B transmissions may be referred to as non-slot-based or mini-slot-based.

Mini-slot transmissions can be dynamically scheduled and for NR Rel-15:
 Can be of length 7, 4, or 2 symbols for DL, while it can be of any length for UL.
 Can start and end in any symbol within a slot.
Note that mini-slot transmissions in NR Rel-15 may not cross the slot-border.

One of the two frequency hopping modes, inter-slot and intra-slot frequency hopping, can be configured via higher layer for PUSCH transmission in NR Rel-15, in Information Element (IE) PUSCH-Config for dynamic transmission or IE configuredGrantConfig for type 1 and type 2 CG.

PUSCH Transmission Schemes

In NR, there are two transmission schemes specified for PUSCH.

Codebook Based PUSCH

The Codebook based UL transmission is used on both NR and Long Term Evolution (LTE) and was motivated to be used for non-calibrated UEs and/or UL Frequency-Domain Duplexing (FDD). Codebook based PUSCH in NR is enabled if higher layer parameter txConfig=codebook. For dynamically scheduled PUSCH and CG PUSCH type 2, the Codebook based PUSCH transmission scheme can be summarized as follows:
 The UE transmits one or two Sounding Reference Signal (SRS) resources (i.e., one or two SRS resources configured in the SRS resource set associated with the higher layer parameter usage of value 'CodeBook').
 The gNB determines a preferred Multiple-Input Multiple-Output (MIMO) transmit precoder for PUSCH (e.g., Transmit Precoding Matrix Indicator (TPMI)) from a codebook and the associated number of layers corresponding to the one or two SRS resources.
 The gNB indicates a selected SRS resource via a 1-bit 'SRS resource indicator' field if two SRS resources are configured in the SRS resource set. The 'SRS resource indicator' field is not indicated in DCI if only one SRS resource is configured in the SRS resource set.

The gNB indicates a TPMI and the associated number of layers corresponding to the indicated SRS resource (in case two SRS resources are used) or the configured SRS resource (in case one SRS resource is used). TPMI and the number of PUSCH layers is indicated by the 'Precoding information and number of layers' field in DCI formats 0_1 and 0_2.

The UE performs PUSCH transmission using the TPMI and number of layers indicated. If one SRS resource is configured in the SRS resource set associated with the higher layer parameter usage of value 'CodeBook', then the PUSCH Demodulation Reference Signal (DMRS) is spatially related to the most recent SRS transmission in this SRS resource. If two SRS resources are configured in the SRS resource set associated with the higher layer parameter usage of value 'CodeBook', then the PUSCH DMRS is spatially related to the most recent SRS transmission in the SRS resource indicated by the 'SRS resource indicator' field.

Non-Codebook Based PUSCH

Non-Codebook based UL transmission is available in NR, enabling reciprocity-based UL transmission. By assigning a DL Channel State Information Reference Signal (CSI-RS) to the UE, it can measure and deduce suitable precoder weights for PUSCH transmission of up to four spatial layers. The candidate precoder weights are transmitted using up to four single-port SRS resources corresponding to the spatial layers. Subsequently, the gNB indicates the transmission rank and multiple SRS resource indicators, jointly encoded using $$\left\lceil \log_2\left( \sum_{k=1}^{\min(L_{max}, N_{SRS})} \binom{N_{SRS}}{k} \right) \right\rceil \text{ bits,}$$

where $N_{SRS}$ indicates the number of configured SRS resources, and $L_{max}$ is the maximum number of supported layers for PUSCH.

PUSCH Repetition

When transmitting PUSCH scheduled by DCI format 0_1 in PDCCH with Cyclic Redundancy Check (CRC) scrambled with Cell Radio Network Temporary Identifier (C-RNTI), Modulation Coding Scheme C-RNTI (MCS-C-RNTI), or Configured Scheduling Radio Network Temporary Identifier (CS-RNTI) with New Data Indicator (NDI)=1, if the UE is configured with a higher layer parameter pusch-AggregationFactor, the same symbol allocation is applied across the pusch-AggregationFactor consecutive slots and the PUSCH is limited to a single transmission layer. The UE shall repeat the Transport Block (TB) (e.g., data payload transported over a number of RBs) across the pusch-AggregationFactor consecutive slots applying the same symbol allocation in each slot.

NR Release 16 PUSCH Enhancements

In NR Release 16 (Rel-16), PUSCH repetition enhancements were made for both PUSCH Type A and Type B for the purposes of further latency reduction (i.e., for Rel-16 Ultra-Reliable Low-Latency Communication (URLLC)).

PUSCH Repetition Type A (Slot Based) Enhancements

In NR Rel-15, the number of aggregated slots for both dynamic grant and CG Type 2 are RRC configured. In NR Rel-16, this was enhanced so that the number of repetitions can be dynamically indicated, i.e., change from one PUSCH scheduling occasion to the next. That is, in addition to the starting symbol S, and the length of the PUSCH L, a number of nominal repetitions K is signaled as part of Time-Domain Resource Allocation (TDRA). Furthermore, the maximum number of aggregated slots was increased to K=16 to account for DL-heavy Time-Domain Duplexing (TDD) patterns. Inter-slot and intra-slot hopping can be applied for Type A repetition. The number of repetitions K is nominal since some slots may be DL slots and are then skipped for PUSCH transmissions. So K is the maximal number of repetitions possible.

PUSCH Repetition Type B (Mini-Slot Based) Enhancements

PUSCH repetition Type B applies both to dynamic and configured grants. Type B PUSCH repetition can cross the slot boundary in Rel-16. When scheduling a transmission with PUSCH repetition Type B, in addition to the starting symbol S, and the length of the PUSCH L, a number of nominal repetitions K is signaled as part of TDRA in NR Rel-16. Inter-slot frequency hopping and inter-repetition frequency hopping can be configured for Type B repetition. To determine the actual time-domain allocation of Type B PUSCH repetitions, a two-step process is used:

1) Allocate K nominal repetitions of length L back-to-back (adjacent in time), ignoring slot boundaries and TDD pattern.
2) If a nominal repetition crosses a slot boundary or occupies symbols not usable for UL transmission (e.g., UL/DL switching points due to TDD pattern), the offending nominal repetition may be split into two or more shorter actual repetitions. If the number of potentially valid symbols for PUSCH repetition Type B transmission is greater than zero for a nominal repetition, the nominal repetition consists of one or more actual repetitions, where each actual repetition consists of a consecutive set of potentially valid symbols that can be used for PUSCH repetition Type B transmission within a slot.

FIG. 3A is a schematic block diagram of an example allocation of nominal repetitions in which one of the nominal repetitions crosses a slot boundary. FIG. 3B is a schematic block diagram of splitting the nominal repetitions of FIG. 3A into actual repetitions. In this example, four nominal repetitions are allocated back-to-back, starting in slot 1 and continuing in slot 2. The second nominal repetition crosses the slot border and is split into two actual repetitions.

Each repetition contains DMRS, with the position of the DMRS in each repetition following Rel-15 rules.

Redundancy Version

The channel encoder can be controlled by the RV. In NR, an information payload can be encoded with four different RVs, to allow for incremental redundancy decoding. The redundancy version to be applied on the nth transmission occasion of the TB, where n=0,1, . . . K−1, is determined according to Table 1 below.

TABLE 1

Redundancy version for PUSCH transmission.

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

UE UL Multi-Panel Switch

A UE may be equipped with multiple UL panels. However, in some cases, it may have only one UL processing chain to transmit and switching between panels requires extra processing time. The UE may also share a processing chain between the panels, if the number of processing chains is smaller than the number of panels. Here, the panel can also be interpreted as a set of antenna ports. A UE may require different panel switching times depending on UE hardware or software design. The UE may transmit to different Transmission/Reception Points (TRPs) with different panels.

Frequency Hopping

To obtain frequency diversity in the UL, frequency hopping can be used where the data in the first set of OFDM symbols in the slot are transmitted on the RB as indicated by the scheduling grant. In the remaining OFDM symbols, data are transmitted on a different set of RBs given by a configurable offset from the first set. UL frequency hopping can be dynamically controlled using a bit in the DCI scheduling the transmission.

NR rel-15 supports inter-slot and intra-slot frequency hopping, with equations describing the starting RB given by Equation 1 and Equation 2 below, where $RB_{start}$ is the starting RB within the UL Bandwidth Part (BWP), $RB_{offset}$ is the frequency offset in RBs between the two frequency hops.

Intra-Slot Frequency Hopping:

$$RB_{start} = \begin{cases} RB_{start} & i = 0 \\ (RB_{start} + RB_{offset}) \bmod N_{BWP}^{size} & i = 1 \end{cases} \quad \text{Equation 1}$$

where i=0 and i=1 are the first hop and the second hop respectively.

Inter-Slot Frequency Hopping:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{Equation 2}$$

where $n_s^\mu$ is the current slot number within a radio frame, where a multi-slot PUSCH transmission can take place.

NR Rel-16 introduced PUSCH repetition Type B, for which inter-repetition frequency hopping and inter-slot frequency hopping can be configured.

In case of inter-repetition frequency hopping, the starting RB for an actual repetition within the nth nominal repetition (as defined in Clause 6.1.2.1) is given by Equation 3:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{Equation 3}$$

where $RB_{start}$ is the starting RB within the UL BWP, as calculated from the resource block assignment information of resource allocation type 1 (described in Subclause 6.1.2.2.2) and $RB_{offset}$ is the frequency offset in RBs between the two frequency hops.

Spatial Relation Definition

Spatial relation is used in NR to refer to a relationship between an UL Reference Signal (RS) to be transmitted, such as PUCCH/PUSCH DMRS, and another previously transmitted or received RS, which can be either a DL RS (e.g., CSI-RS or Synchronization Signal Block (SSB)) or an UL RS (e.g., SRS). This is also defined from a UE perspective.

If an UL transmitted RS is spatially related to a DL RS, it means that the UE should transmit the UL RS in the opposite (reciprocal) direction from which it received the DL RS previously. More precisely, the UE should apply the "same" Transmit (TX) spatial filtering configuration for the transmission of the UL RS as the Receive (RX) spatial filtering configuration it used to receive the spatially related DL RS previously. Here, the terminology 'spatial filtering configuration' may refer to the antenna weights that are applied at either the transmitter or the receiver for data/control transmission/reception. Another way to describe this is that the same "beam" should be used to transmit the signal from the UE as was used to receive the previous DL RS signal. The DL RS is also referred to as the spatial filter reference signal.

On the other hand, if a first UL RS is spatially related to a second UL RS, then the UE should apply the same TX spatial filtering configuration for the transmission for the first UL RS as the TX spatial filtering configuration it used to transmit the second UL RS previously. In other words, the same beam is used to transmit the first and second UL RS respectively.

Since the UL RS is associated with a layer of PUSCH or PUCCH transmission, it is understood that the PUSCH/PUCCH is also transmitted with the same TX spatial filter as the associated UL RS.

In some cases, the spatial relation information can also be provided in a Transmission Configuration Information (TCI) state which is indicated to the UE.

TCI States for UL

In NR Rel-15, the handling of spatial transmission properties is different for PUSCH, PUCCH, and SRS. For PUCCH, the spatial relation information is defined in IE PUCCH-SpatialRelationInfo, and the spatial relation information for SRS is configured as part of SRS resource configuration. The spatial transmission properties for PUSCH are given by the spatial transmission properties associated with the SRS(s) configured in SRS resource set with usage of 'Codebook' or 'non-Codebook'. In Third Generation Partnership Project (3GPP) Tdoc R1-1909225, it is argued that the Rel-15 way of handling the spatial transmission properties is cumbersome and inflexible when it comes to UL multi-panel transmission in NR. Hence, in Tdoc R1-1909225, TCI states for UL are proposed that can be used to control the spatial properties of all the UL transmissions (e.g., PUSCH, PUCCH, and SRS). The focus in Tdoc R1-1909225 is to be able to use UL TCI state indication to select one of the UL panels and the corresponding transmission beam (e.g., transmission properties) at the UE to transmit UL PUSCH/PUCCH/SRS when the UE is equipped with multiple panels.

In general, TCI states for UL are configured by higher layers (e.g., RRC) for a UE. There are multiple ways of configuring UL TCI states.

In one case, the UL TCI states are dedicated to only UL and are configured separately from the TCI states corresponding to DL. For example, the UL TCI states can be configured as part of the PUSCH-Config IE. Each UL TCI state may indicate a transmission configuration which contains a DL RS (e.g., Non-Zero Power (NZP) CSI-RS or SSB) or an UL RS (e.g., SRS) with the purpose of indicating a spatial relation for PUSCH DMRS. Alternatively, the UL TCI states may be configured as part of BWP-UplinkDedicatedIE such that the same UL TCI state can be used to indicate a DL RS or UL RS which provides the spatial relation for more than one of PUSCH DMRS, PUCCH DMRS, and SRS.

In another case, the same list of TCI states is used for DL and UL, hence the UE is configured with a single list of TCI states which can be used for both UL and DL scheduling. The single list of TCI states in this case are configured as part of for example the PDSCH-Config or the BWP-UplinkDedicatedIEs.

Problems with Existing Solutions

There currently exist certain challenge(s). In NR Rel-16, PUSCH repetition involving multiple TRPs can only be supported with separate PUSCH scheduling or separated activation. In NR Rel-17 and future releases, a single DCI can be used to trigger PUSCH transmission involving multiple TRPs. However, the details of repetition in such cases need to be addressed to facilitate the resource allocation and frequency hopping behavior.

SUMMARY

Physical Uplink Shared Channel (PUSCH) resource allocation with multiple Transmission/Reception Points (TRPs) is provided. Embodiments described herein provide details to facilitate multi-TRP transmission on the PUSCH with respect to User Equipment (UE) implementation and application scenarios. A gap between consecutive PUSCH transmission instances toward different TRPs (e.g., transmission associated with different spatial transmission filters) can be signaled, either semi-statically or dynamically. In case of dynamic signaling, the gap may be configured in a Time Domain Resource Allocation (TDRA) table and indicated in Downlink Control Information (DCI). In case of semi-static signaling, it may be done by Radio Resource Control (RRC).

The gap may be applicable only when certain conditions are met, such as one or more of 1) multiple TRPs are indicated in DCI, 2) type B repetition, and 3) multi-panel is used at a UE. When PUSCH repetition is configured, association of each PUSCH repetition to a TRP can be done by one of the PUSCH repetitions are cycled through multiple TRPs or the PUSCH repetitions are divided among the multiple TRPs and consecutive PUSCH repetitions are associated with and sent to each TRP.

Frequency hopping may be done among the PUSCH repetition in one of the following ways. Inter-TRP hopping, in which frequency hopping is performed over PUSCHs across TRPs. Intra-TRP hopping, in which frequency hopping is performed only over PUSCHs associated with each TRP. The frequency hopping offset may be signaled either dynamically in DCI or semi-statically via RRC.

An RRC configurable Redundancy Version (RV) shift may be signaled to the UE to be applied when determining the RV for PUSCH transmission towards each TRP except for the first TRP.

There are, proposed herein, various embodiments which address one or more of the issues disclosed herein. In some embodiments, a method is performed by a wireless device for transmitting data to multiple TRPs. The method comprises receiving control information for scheduling a multi-TRP transmission, the control information comprising an indication of a gap between each TRP transmission; transmitting the data to a first TRP according to the control information; and after the gap, transmitting the data to a second TRP according to the control information.

In some embodiments, each TRP is characterized by a reference signal transmitted from the TRP and previously received by the wireless device or previously transmitted from the wireless device to the TRP, and is indicated to the wireless device by a spatial relation comprising the reference signal or a Transmission Configuration Information (TCI) state comprising the reference signal.

In some embodiments, the method further comprises indicating a capability of the wireless device to support one or multiple active panels to a network node prior to receiving the control information.

In some embodiments, the control information is received through a DCI message from a network node; and the gap is indicated in a TDRA field of the DCI message. In some embodiments, the multi-TRP transmission is configured with PUSCH repetition Type B. In some embodiments, the wireless device supports multiple panel transmission; and at least one of the fields in the DCI message indicates more than one TRP transmission.

In some embodiments, the gap is indicated as a minimum number of symbols in which the wireless device is not scheduled to transmit or receive over a shared channel between transmitting to the first TRP and transmitting to the second TRP. In some embodiments, the symbols comprising the gap after transmitting to the first TRP are treated as downlink symbols or invalid symbols. In some embodiments, the method further comprises, if the symbols comprising the gap are in a resource block indicated for transmission to the second TRP, transmitting to the second TRP on remaining symbols of the resource block.

In some embodiments, the gap is indicated as a number of symbols after beginning to transmit to the first TRP before beginning to transmit to the second TRP.

In some embodiments, the gap is implicitly indicated by using TDRA for a shared channel repetition associated with the multi-TRP transmission.

In some embodiments, the gap is configured by a higher layer.

In some embodiments, K repetitions are configured for a PUSCH used for the multi-TRP transmission. In some embodiments, the configured repetitions K are applied for each TRP of the multi-TRP transmission. In some embodiments, the configured repetitions K are distributed among the first TRP and the second TRP. In some embodiments, one transmission is made per TRP of the multi-TRP transmission in order and repeats until the configured repetitions K are reached.

In some embodiments, the control information further comprises a flag enabling frequency hopping for the multi- TRP transmission. In some embodiments, the method further comprises applying a frequency hopping offset indicated by the control information on all TRPs of the multi-TRP transmission. In some embodiments, the method further comprises applying a frequency hopping offset, wherein the frequency hopping offset is associated with resource allocation for TRPs of the multi-TRP transmission and indicated by higher layer configuration.

In some embodiments, the method further comprises applying a frequency hopping offset, wherein the control information indicates a single resource allocation for all TRPs of the multi-TRP transmission and the frequency hopping offset is configured by higher layers. In some embodiments, the frequency hopping occurs within a transmission to each TRP; and transmitting to the second TRP occurs after frequency hopping within the transmission to the first TRP and after the gap. In some embodiments, the frequency hopping occurs between transmissions to a same TRP; and the method further comprises transmitting to the first TRP using the frequency hopping offset after transmitting to the second TRP and after another gap.

In some embodiments, the method further comprises applying a RV offset to the multi-TRP transmission in accordance with a received configuration. In some embodiments, the control information indicates a first RV for a first repetition to the first TRP. In some embodiments, a second RV for a first repetition to the second TRP is given by applying the RV offset to the first RV.

In some embodiments, a method is performed by a network node for facilitating transmission to multiple TRPs. The method comprises receiving an indication of a capability of a UE to support one or multiple active panels; scheduling a multi-TRP transmission by the UE based on the indication of the capability; and sending control information for the multi-TRP transmission to the UE, the control information comprising an indication of a gap between each TRP transmission.

In some embodiments, the control information is transmitted through a DCI message; and the gap is indicated in a TDRA field of the DCI message. In some embodiments, the method further comprises configuring the multi-TRP transmission with PUSCH repetition Type B. In some embodiments, the UE has the capability to support multiple active panels; and at least one of the fields in the DCI message indicates more than one TRP transmission.

In some embodiments, the method further comprises not scheduling the UE to transmit or receive over a shared channel during the gap between each TRP transmission.

In some embodiments, the method further comprises configuring K repetitions for a PUSCH used for the multi-TRP transmission.

In some embodiments, the method further comprises enabling frequency hopping for the multi-TRP transmission. In some embodiments, the method further comprises providing a frequency hopping offset to the UE.

In some embodiments, the method further comprises configuring a RV offset for the multi-TRP transmission. In some embodiments, the method further comprises signaling the RV offset to the UE with a RRC message; and signaling a first RV to the UE through a DCI message comprising the control information for the multi-TRP transmission.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5A is a schematic block diagram of a transmission scheme for multiple Physical Uplink Shared Channel (PUSCH) transmission instances, each toward a different Transmission/Reception Point (TRP) according to embodiments described herein.

FIG. 5B is a schematic block diagram of the transmission scheme of FIG. 5A illustrating exemplary parameters for signaling a gap.

FIG. 6A is a schematic block diagram of a transmission scheme for an embodiment with Type B repetition.

FIG. 6B is a schematic block diagram of a transmission scheme for another embodiment with Type B repetition.

DETAILED DESCRIPTION

Figure 1:
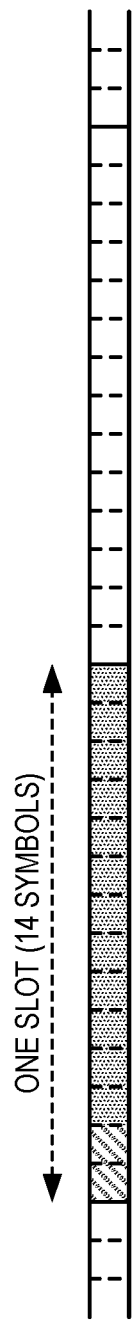
FIG. 1 is a schematic block diagram of a time-domain structure for data scheduling in New Radio (NR).
Figure 2:
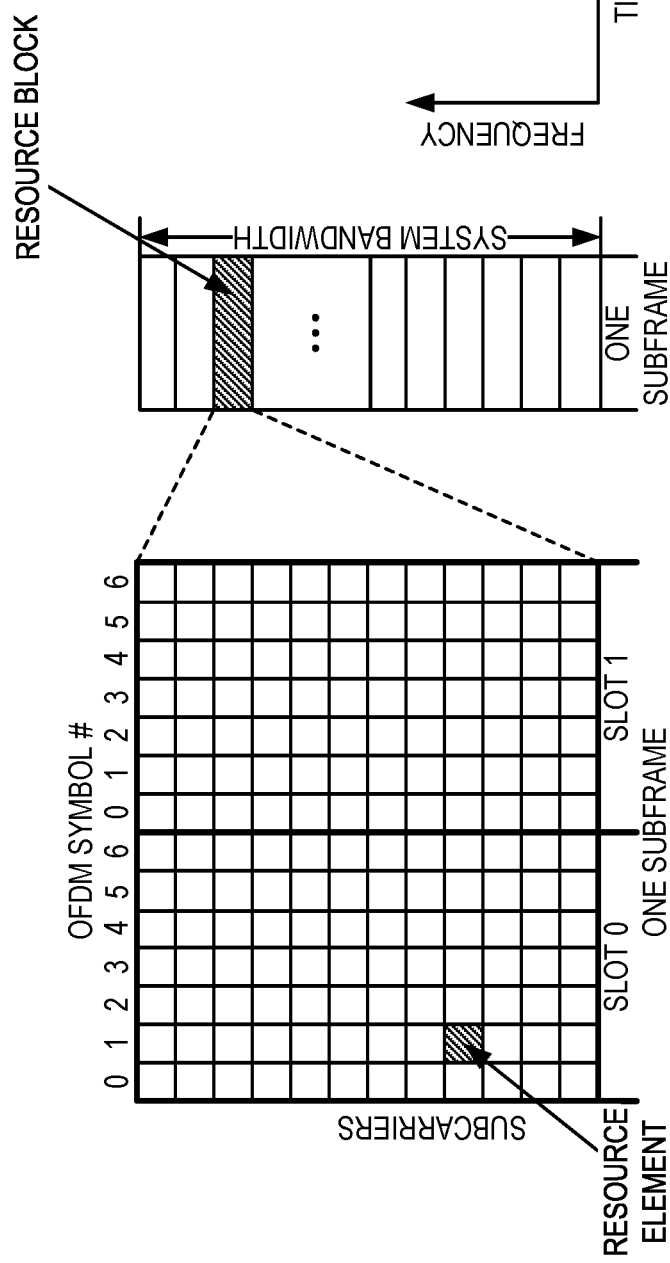
FIG. 2 is a schematic block diagram of a physical time-frequency resource grid for data scheduling in NR.
Figure 3A:
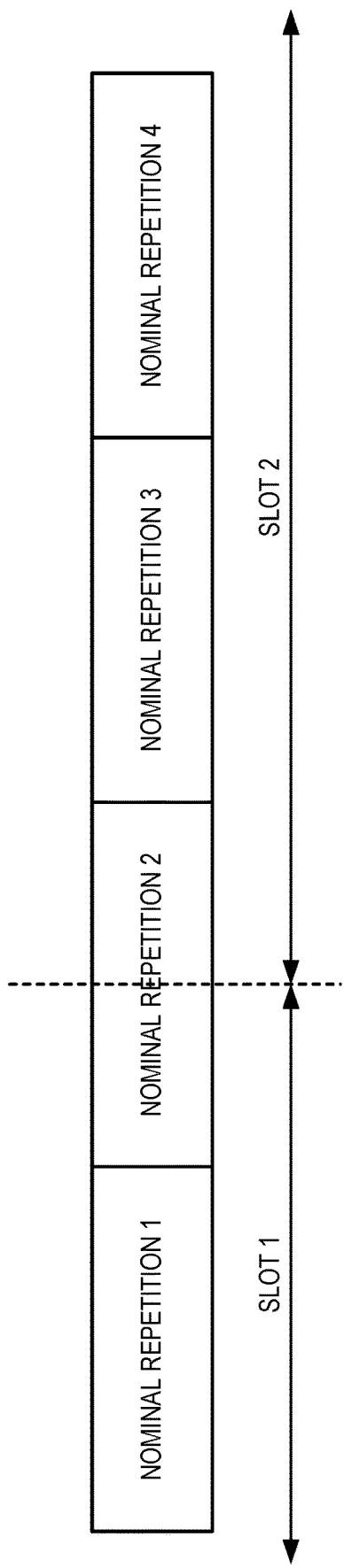
FIG. 3A is a schematic block diagram of an example allocation of nominal repetitions in which one of the nominal repetitions crosses a slot boundary.
Figure 3B:
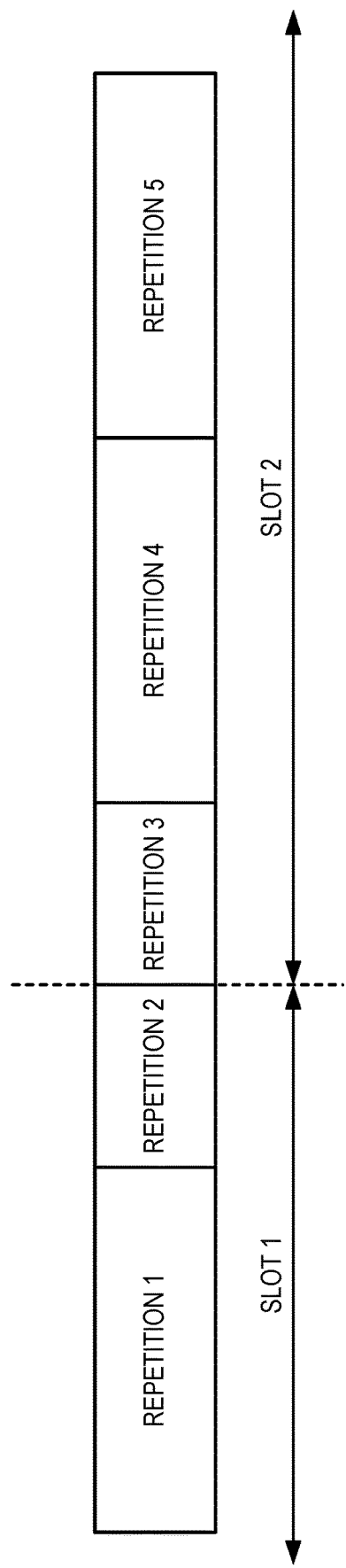
FIG. 3B is a schematic block diagram of splitting the nominal repetitions of FIG. 3A into actual repetitions.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment (UE) device in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
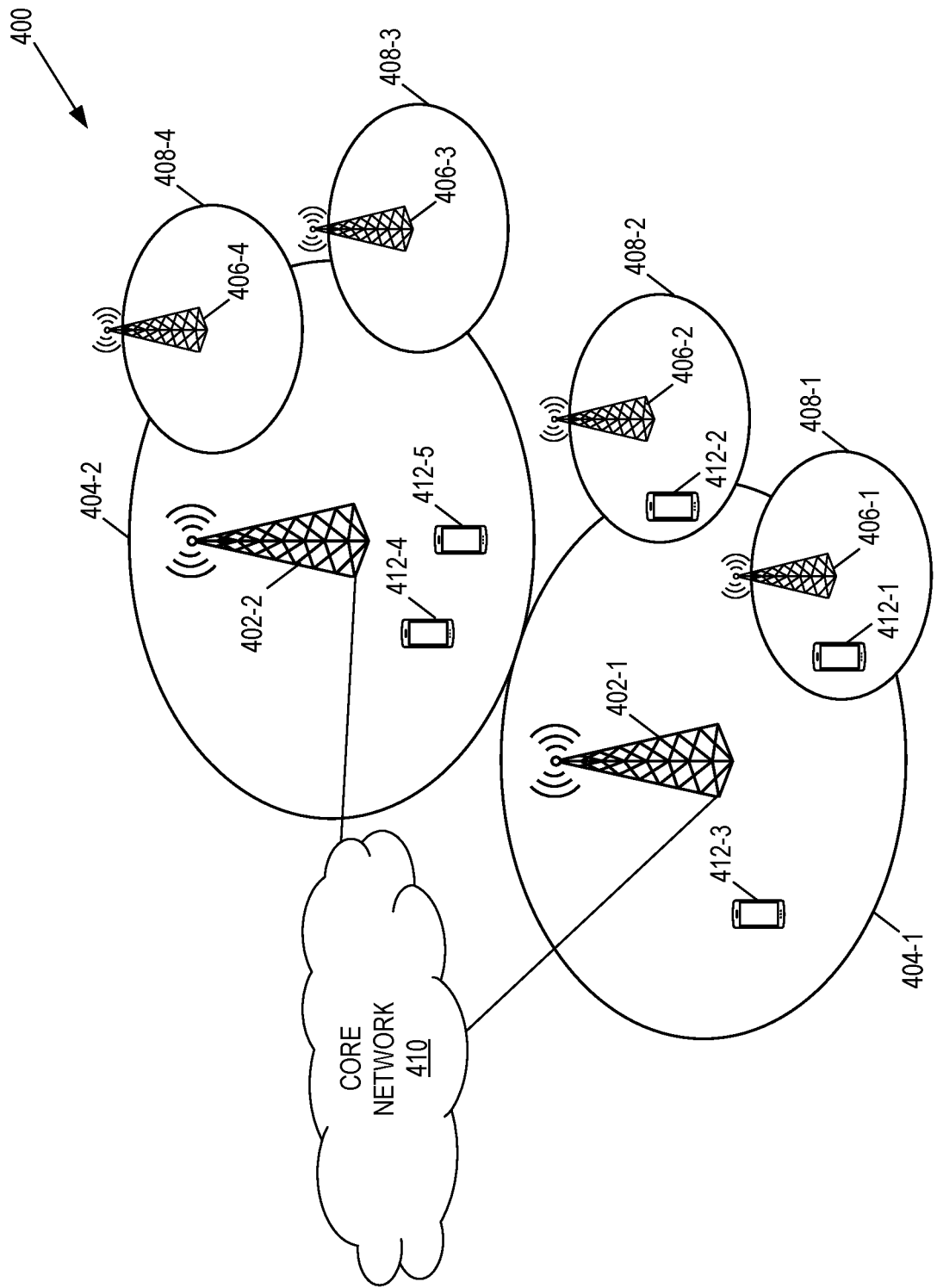
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G System (5GS) including a NR RAN or LTE RAN (i.e., Evolved Universal Terrestrial Radio Access (E-UTRA) RAN) or an Evolved Packet System (EPS) including a LTE RAN. In this example, the RAN includes base stations 402-1 and 402-2, which in LTE are referred to as eNBs (when connected to Evolved Packet Core (EPC)) and in 5G NR are referred to as gNBs (e.g., LTE RAN nodes connected to 5G Core (5GC), which are referred to as gn-eNBs), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Throughout this disclosure, the term Physical Uplink Shared Channel (PUSCH) transmission towards two or more Transmission/Reception Points (TRPs) is used. This means that the UE uses different (e.g., two or more) spatial transmission filters to target the PUSCH transmission towards two or more TRPs. The spatial transmission information to be used by the UE are indicated to the UE via spatial relation or Transmission Configuration Information (TCI) state which provides the source Reference Signal (RS) (which can be a Downlink (DL) RS or Uplink (UL) RS) from which the spatial transmission filters to be used for PUSCH Demodulation RS (DMRS) are derived. In general, there will be one spatial transmission filter (provided by either spatial relation or a TCI state) used to target a PUSCH transmission towards a TRP. That is, if a UE is to target PUSCH towards two different TRPs, then two spatial relations or two TCI states need to be indicated to the UE. In some other cases, transmission of PUSCH towards a TRP may mean that the UE uses one of the panels for this transmission (e.g., different panels are used to transmit PUSCH towards different TRPs). In these cases, the UE may also be indicated with one or more panel identifiers which tells the UE which panels to use (e.g., which TRPs to target PUSCH towards).

FIG. 5A is a schematic block diagram of a transmission scheme for multiple PUSCH transmission instances, each toward a different TRP according to embodiments described herein. When a UE (e.g., wireless communication device 412 of FIG. 4) transmits multiple PUSCH transmission instances or actual repetitions toward two or more TRPs (e.g., base stations 402, low power nodes 406, and the like), a minimum gap between two consecutive PUSCH transmission instances towards different TRPs can be configured by the network (e.g., the RAN of FIG. 4). Further to the above discussion, each TRP can be characterized by a reference signal transmitted from the TRP and previously received by the wireless device or previously transmitted from the wireless device to the TRP, and is indicated to the wireless device by a spatial relation (or a TCI state) comprising the reference signal. In some embodiments, whether a UE supports having a minimum gap and the values of the minimum gap required are reported to the network as part of UE capabilities. The reason for configuring this minimum gap is to allow the UE to switch between multiple panels. The gap can be considered as a guard period during which the UE is not expected to perform any transmission or reception while the UE is switching from transmitting a first PUSCH instance towards a first TRP to transmitting a second PUSCH instance towards another TRP.

In an exemplary aspect, a UE that supports only one active panel at a time (e.g., only one of the UE UL panel can transmit PUSCH at a time) indicates that capability via Radio Resource Control (RRC) signaling for which a longer gap time is needed.

In another exemplary aspect, a UE that supports two or more active panels simultaneously indicates its capability via RRC signaling, for which a much shorter gap or even 0 switching time is needed when the switched number of TRPs is smaller than the number of panels it can simultaneously support. There may be other conditions for a UE to fulfill 0 switching time, such as a required number of ports per TRP transmission, a reference signal constellation, and/or a time between the receiving of a Physical Downlink Control Channel (PDCCH) and the transmitting of the corresponding PUSCH. The gNB shall respect the gap requirement when scheduling a UE with multiple TRPs.

Signaling of Gap

FIG. 5B is a schematic block diagram of the transmission scheme of FIG. 5A illustrating exemplary parameters for signaling the gap.

Embodiment A: When PUSCH transmission involves two or more TRPs, a gap between the PUSCH transmission instances to facilitate switching PUSCH transmission from one TRP to another TRP can be dynamically indicated (e.g., via a Downlink Control Information (DCI) that schedules PUSCH).

Embodiment A1: In one embodiment, if a single DCI is used to schedule a multi-TRP transmission, a gap Z in number of symbols is indicated in the Time-Domain Resource Allocation (TDRA) field. The TDRA indicated in the DCI applies for the first TRP transmission instance. A successive PUSCH transmission instance towards the next TRP starts after Z symbols indicated by DCI from the end of PUSCH transmission targeting the first TRP.

In this regard, as illustrated in FIG. 5B, if the transmission instance towards a first TRP starts at slot X with start symbol S and length L as indicated in the TDRA table, the transmission instance towards a second TRP starts at slot X+floor((S+L+Z)/numberOfSymbolsPerSlot), and the starting symbol relative to the start of the starting slot for the second TRP is given by mod(S+L+Z,numberOfSymbolsPerSlot). The ending slot is given by X+floor((S+2*L+Z−1)/numberOfSymbolsPerSlot), and the ending symbol relative to the start of ending slot of the second TRP is given by mod(S+2*L+Z−1,numberOfSymbolsPerSlot).

Embodiment A2: In one embodiment, the Z symbols after the previous TRP transmission are treated as DL symbols or invalid symbols. If any of these Z symbols is within the symbols that are indicated to transmit the PUSCH instance for the next TRP, the UE consider those symbols as invalid and transmits on the remaining symbols of the same Transport Block (TB). The range for transmission length L may further be restricted with L>Z or L>(Z+1).

In this regard, the transmission with the second TRP starts at slot X+floor((S+L+Z)/numberOfSymbolsPerSlot), and the starting symbol relative to the start of the starting slot for the second TRP is given by mod(S+L+Z,numberOfSymbolsPerSlot). The ending slot is given by X+floor((S+2*L−1)/numberOfSymbolsPerSlot), and the ending symbol relative to the start of the ending slot of the second TRP is given by mod(S+2*L−1,numberOfSymbolsPerSlot).

Embodiment A3: In one embodiment, the gap can be configured in the TDRA field only if the DCI scheduling the PUSCH is configured with PUSCH repetition Type B.

Embodiment A4: In one embodiment, the gap can be configured in the TDRA field only if:
the PUSCH is configured with PUSCH repetition Type B;
the UE supports multiple panel transmission; and
at least one of the fields in the DCI can indicate PUSCH transmission towards more than one TRP (e.g., via indicating multiple spatial relations or multiple TCIs). The field can be 'Precoding information and number of layers', 'SRS resource indicator', or 'Antenna ports'. In some embodiments, the field can also be a TCI state. The DCI format can be 0_1 or 0_2.

Embodiment A5: In one embodiment, the gap is implicitly indicated by using the TDRA for one of the PUSCH repetitions, at the end of each repetition bundle for the same TRP within all TRPs except the last TRP.

Embodiment B: When a PUSCH transmission involves two or more TRPs, a gap between the PUSCH transmission instances while switching the TRPs can be configured by a higher layer.

Apply Repetition on Each TRP with Gap

Denote K as a repetition configured by pusch-AggregationFactor, repK, or numberOfRepetitions. Denote P as the number of TRPs associated with a PUSCH transmission indicated by one DCI. The order of TRPs to perform the transmission and the number of TRPs is indicated by the DCI and/or higher layer configurations. The gap is denoted as the number of symbols Z in the embodiments below. If a gap is given as a time duration T and $T_s$ denotes a time duration for an OFDM symbol for the scheduled PUSCH transmission, Z can be derived with ceiling($T/T_s$).

Embodiment C: A gap can be applied between the PUSCH transmission instances when switching the TRPs. Upon receiving a DCI indicating a PUSCH transmission, the UE reads from the TDRA field the K2 and the start symbol S and length L (S and L can be derived from the Start and Length Indicator Values (SLIV)) for its first PUSCH transmission instance with the first TRP.

Decision of Number of Repetitions for Each TRP

Embodiment C1: In one embodiment, the configured K (nominal) PUSCH repetitions shall be applied for each TRP.

Embodiment C2: In one embodiment, the configured repetition K for PUSCH repetition Type A or PUSCH repetition Type B shall be distributed among each TRP. For the first P−1 TRPs the repetition is decided by R=floor(K/P) or R=ceiling(K/P). The UE transmits R (nominal) PUSCH repetition with each TRP within the first (P−1) TRPs, and the UE transmits the remaining K−R*(P−1) (nominal) repetition with the last TRP.

Embodiment C3: In one embodiment, the UE transmits one (nominal) PUSCH transmission instance per TRP in the order indicated by DCI among the P TRPs and repeats until K nominal transmissions have been reached.

Embodiment C4: In one embodiment, the UE transmits the PUSCH transmission instance with the next TRP after Z symbols of the PUSCH transmission instance with the latest TRP. The number of symbols for the PUSCH repetition with the next TRP is the same as indicated in SLIV.

For Embodiments C2 and C3, K=1 implicitly indicates a single TRP transmission. A sufficient signaling flexibility can be achieved to switch among the required number of TRPs for a transmission.

TDRA for Each TRP with Repetition

For Embodiments C1 and C2, denote the number of repetitions for each TRP as $R_1, R_2, \ldots, R_P$. $R_0=0$. The following methods can be applied to decide the resource allocation for each repetition.

In one method of embodiment C3, the Z symbols after the previous TRP transmission are treated as DL symbols or invalid symbols. If any of these Z symbols is within the symbols that are indicated to transmit the PUSCH transmission instance for the next TRP, the UE consider those symbols as invalid and transmits on the remaining symbols in the same TB. The range for transmission length L may further be restricted with L>Z or L>(Z+1). This method can be applied for both Type A and Type B PUSCH repetition.

FIG. 6A is a schematic block diagram of a transmission scheme for embodiment C3 with Type B repetition. In this regard, for Type B repetition and a transmission with TRP p at nominal repetition $n_i (i=0, \ldots, R_p-1)$, each repetition starts at slot K2+floor((S+Z+L*$\Sigma_{j=0}^{p-1}R_j$+L*$n_i$)/numberOfSymbolsPerSlot). The starting symbol relative to the start of the starting slot for the pth TRP is given by mod((S+Z+L*$\Sigma_{j=0}^{p-1}R_j$+L*$n_i$)/numberOfSymbolsPerSlot). The ending slot for each repetition is given by K2+floor((S+L*$\Sigma_{j=0}^{p-1}R_j$+L*($n_i$+1)−1)/numberOfSymbolsPerSlot), and the ending symbol relative to the start of the ending slot of the second TRP is given by mod((S+L*$\Sigma_{j=0}^{p-1}R_j$+L*($n_i$+1)−1)/numberOfSymbolsPerSlot). The UE may be required to send an additional DMRS symbol after the gap.

For Type A repetition, the UE may be required to send an additional DMRS symbol if the gap is within the PUSCH allocation.

FIG. 6B is a schematic block diagram of a transmission scheme for embodiment C4 with Type B repetition. In this regard, for Type B repetition and a transmission with TRP p at nominal repetition $n_i (i=0, \ldots, R_p-1)$, each repetition starts at slot K2+floor((S+L*$\Sigma_{j=0}^{p-1}R_j$+L*$n_i$+Z*(p−1))/numberOfSymbolsPerSlot). The starting symbol relative to the start of the starting slot for the pth TRP is given by mod((S+L*$\Sigma_{j=0}^{p-1}R_j$+L*$n_i$+Z*(p−1))/numberOfSymbolsPerSlot). The ending slot for each repetition is given by K2+floor((S+L*$\Sigma_{j=0}^{p-1}R_j$+L*($n_i$+1)+Z*(p−1)−1)/numberOfSymbolsPerSlot), and the ending symbol relative to the start of the ending slot of the second TRP is given by mod((S+L*$\Sigma_{j=0}^{p-1}R_j$+L*($n_i$+1)+Z*(p−1)−1)/numberOfSymbolsPerSlot).

Apply Frequency Hopping to Multi-TRP

To achieve diversity in the frequency domain within each TRP, a hopping position shall be specified if frequency hopping is enabled in a single DCI that triggers a Multi-TRP transmission. In the embodiments below the scenario when a single DCI addresses Multi-TRP PUSCH transmission with frequency hopping flag enabled is considered.

In one embodiment, one hopping offset is indicated in DCI which shall be applied on all the TRPs. Within each TRP, the hopping is performed independently as a single TRP transmission. If the TRP is not the first TRP (in order) to perform transmission, the set of symbols to transmit the first transmission associated with this TRP shall be derived from the transmission of a previous TRP associated with the same DCI.

In this regard, the hopping number n is separately counted for each TRP when applying the hopping formula. As an alternative, n is jointly counted considering all the TRPs associated with this DCI. As another alternative, n can be either counted as a nominal repetition for PUSCH Type B repetition, or the slot number for inter-slot repetition. For intra-slot repetition, n is the slot number in a frame and is independent of the numbering order of TRPs.

In one embodiment, the Resource Block (RB) start of each actual repetition is decided by the numbering of nominal repetitions accumulated on all the transmitted repetition within all TRPs. In this regard, P denotes the total number of TRPs, $R_i$ denotes the total number of nominal repetitions per TRP i, . . . , $n_i$ as a number of nominal repetitions for current TRP i, where i=0,1,2, . . . , P−1, $n_i$=0,1, . . . , $R_i$−1:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases}$$

where $n = \Sigma_{i=0}^{p-1} R_i + n_i$.

In one embodiment, the hopping offset is associated with resource allocation for TRPs and indicated by higher layer configuration. If the resource allocation for the set of RBs in the frequency domain for TRP1, TRP2, TRP3 is indicated as (RBset1, RBset2, RBset3) for the first transmission associated with each TRP, the second transmission for TRP1, TRP2, TRP3 uses the RB sets (RBset2, RBset3, RBset1). The frequency-domain resource allocation thus rotates among the TRPs.

In yet another embodiment, a single resource allocation is indicated in a DCI for all TRPs, and a hopping offset is configured by the higher layers and is applicable to PUSCH transmissions to all TRPs. In addition, only intra-TRP frequency hopping is supported in which frequency hopping is performed in a per TRP basis.

Figure 7A:
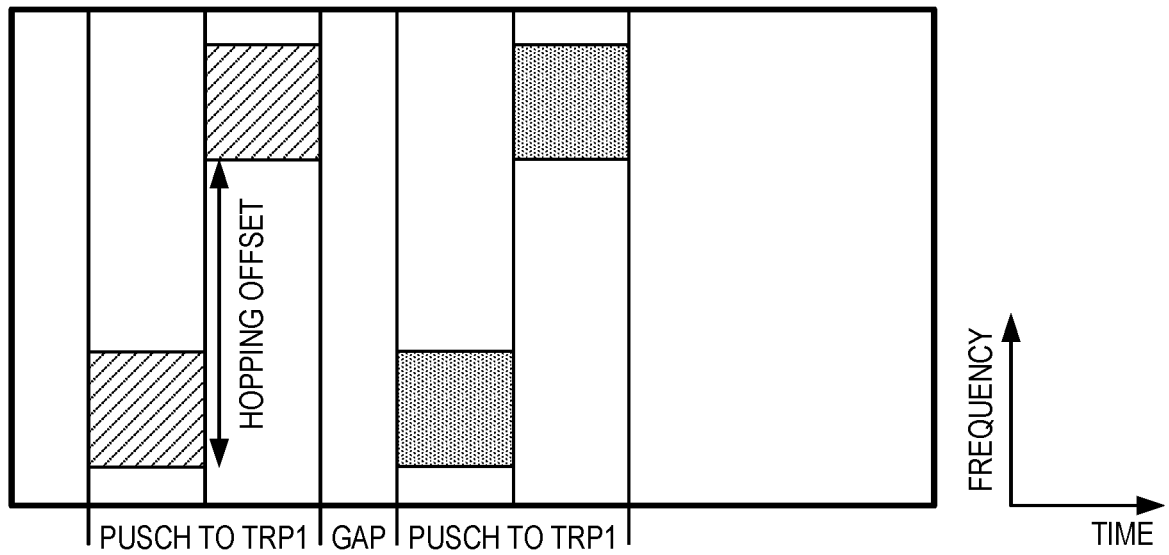
FIG. 7A is a schematic block diagram illustrating an example of intra-TRP frequency hopping in a first scenario, where frequency hopping occurs within a PUSCH transmission to each TRP.
Figure 7B:
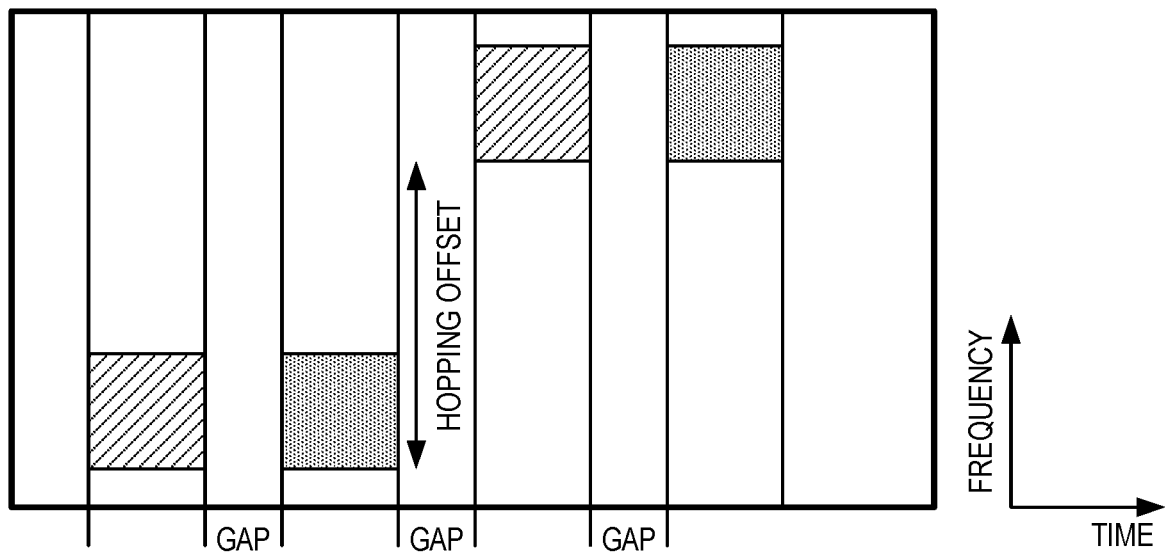
FIG. 7B is a schematic block diagram illustrating an example of intra-TRP frequency hopping in a second scenario, where frequency hopping occurs between PUSCH transmissions to a same TRP.

FIG. 7A is a schematic block diagram illustrating an example of intra-TRP frequency hopping in scenario A, where frequency hopping occurs within a PUSCH transmission to each TRP. FIG. 7B is a schematic block diagram illustrating an example of intra-TRP frequency hopping in scenario B, where frequency hopping occurs between PUSCH transmissions to a same TRP.

RV Allocation to PUSCH Transmission Towards the Different TRPs

In some embodiments, when PUSCH transmission towards two TRPs is indicated to the UE, the redundancy version to be applied to the PUSCH transmission towards the first TRP is given according to the $rv_{id}$ indicated by the DCI scheduling the PUSCH and following the pattern given in Table 1. The redundancy version to be applied to the PUSCH transmission corresponding to the second TRP is given according to the $rv_{id}$ indicated by the DCI scheduling the PUSCH and following the pattern given in Table 2 where an RRC configurable parameter specific to UL $rv_{UL,s}$ is used to shift the RV. In this embodiment, n is counted only considering the transmission towards a given TRP. For instance, when UE transmits to TRP1 in transmission occasion 1 and 2, and transmits to TRP 2 in transmission occasions 3 and 4:

for transmission occasions 1 and 2, the corresponding n values are 1 and 2, respectively.
for transmission occasions 3 and 4, the corresponding n values are 1 and 2, respectively.

The benefit of using such a configurable RV shift in UL is allows the Rel-15 RV sequences to be applied per PUSCH transmission towards each TRP.

optional step 810, the wireless device applies a RV offset to the multi-TRP transmission in accordance with a received configuration (e.g., received via RRC).

Figure 9:
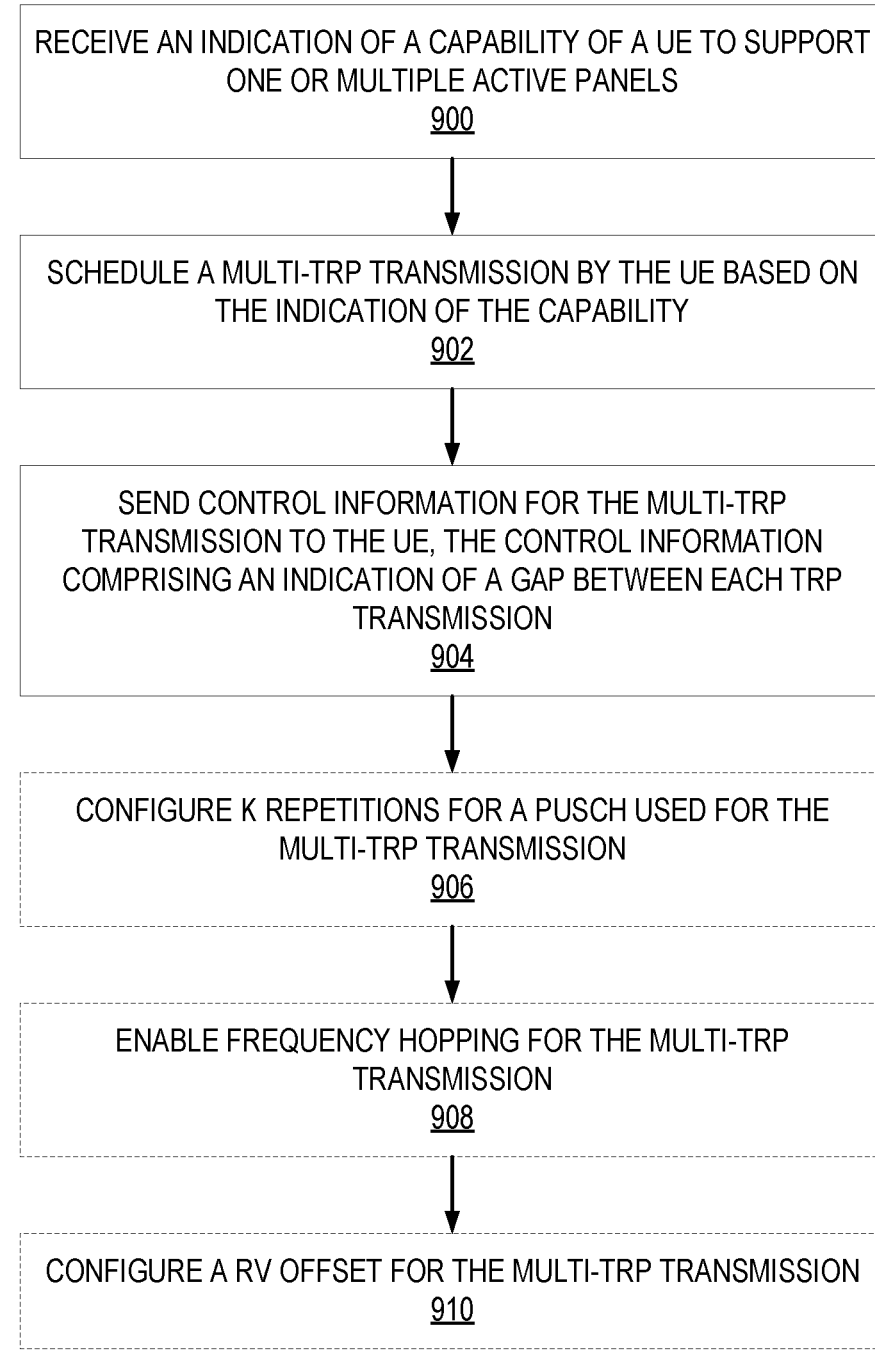
FIG. 9 is a flowchart illustrating a method for facilitating transmission to multiple TRPs, in accordance with one embodiment.

FIG. 9 is a flowchart illustrating a method for facilitating transmission to multiple TRPs, in accordance with one embodiment. The method may be implemented in a network node (e.g., a base station or other network node). Optional steps are indicated with dashed lines. In step 900, the network node receives an indication of a capability of a UE to support one or multiple active panels. In step 902, the network node schedules a multi-TRP transmission by the UE based on the indication of the capability. In step 904, the network node sends control information for the multi-TRP transmission to the UE, the control information comprising an indication of a gap between each TRP transmission. In optional step 906, the network node configures K repetitions for a PUSCH used for the multi-TRP transmission. In optional step 908, the network node enables frequency hopping for the multi-TRP transmission. In optional step 910, the network node configures a RV offset for the multi-TRP transmission.

Figure 10:
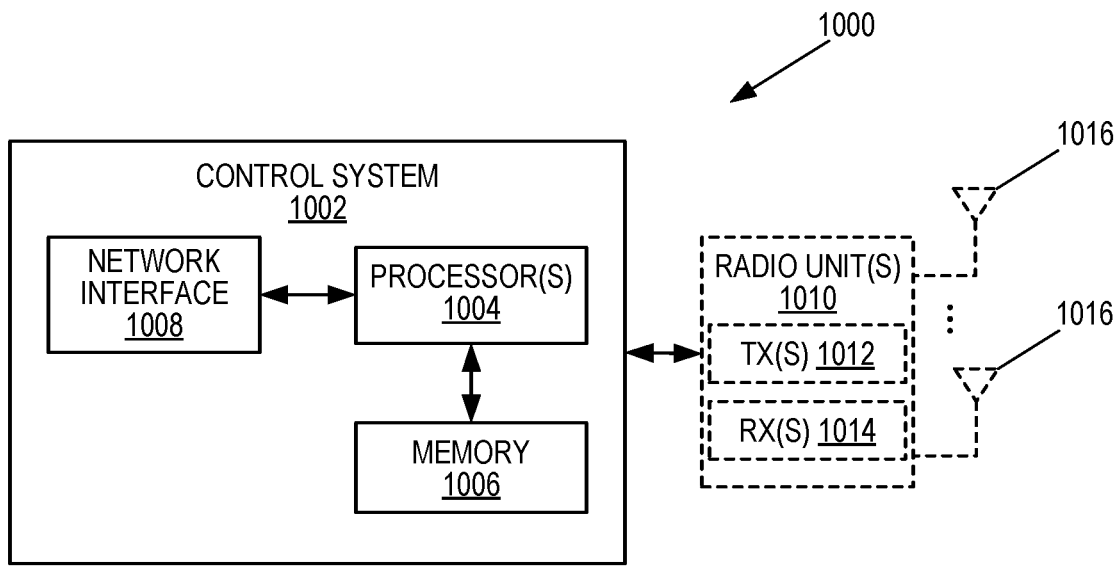
FIG. 10 is a schematic block diagram of a network node according to some embodiments of the present disclosure.

FIG. 10 is a schematic block diagram of a network node 1000 according to some embodiments of the present disclosure. Optional features are represented by dashed boxes. The network node 1000 may be, for example, a base station 402 or 406 or another network node that implements all or part of the functionality of the base station 402 or gNB described herein. As illustrated, the network node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addi-

TABLE 2

Redundancy version corresponding to the 2nd UL TCI state when a redundancy version shifting parameter is configured for UL.

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | $(0 + rv_{UL,s})$ mod 4 | $(2 + rv_{UL,s})$ mod 4 | $(3 + rv_{UL,s})$ mod 4 | $(1 + rv_{UL,s})$ mod 4 |
| 2 | $(2 + rv_{UL,s})$ mod 4 | $(3 + rv_{UL,s})$ mod 4 | $(1 + rv_{UL,s})$ mod 4 | $(0 + rv_{UL,s})$ mod 4 |
| 3 | $(3 + rv_{UL,s})$ mod 4 | $(1 + rv_{UL,s})$ mod 4 | $(0 + rv_{UL,s})$ mod 4 | $(2 + rv_{UL,s})$ mod 4 |
| 1 | $(1 + rv_{UL,s})$ mod 4 | $(0 + rv_{UL,s})$ mod 4 | $(2 + rv_{UL,s})$ mod 4 | $(3 + rv_{UL,s})$ mod 4 |

Figure 8:
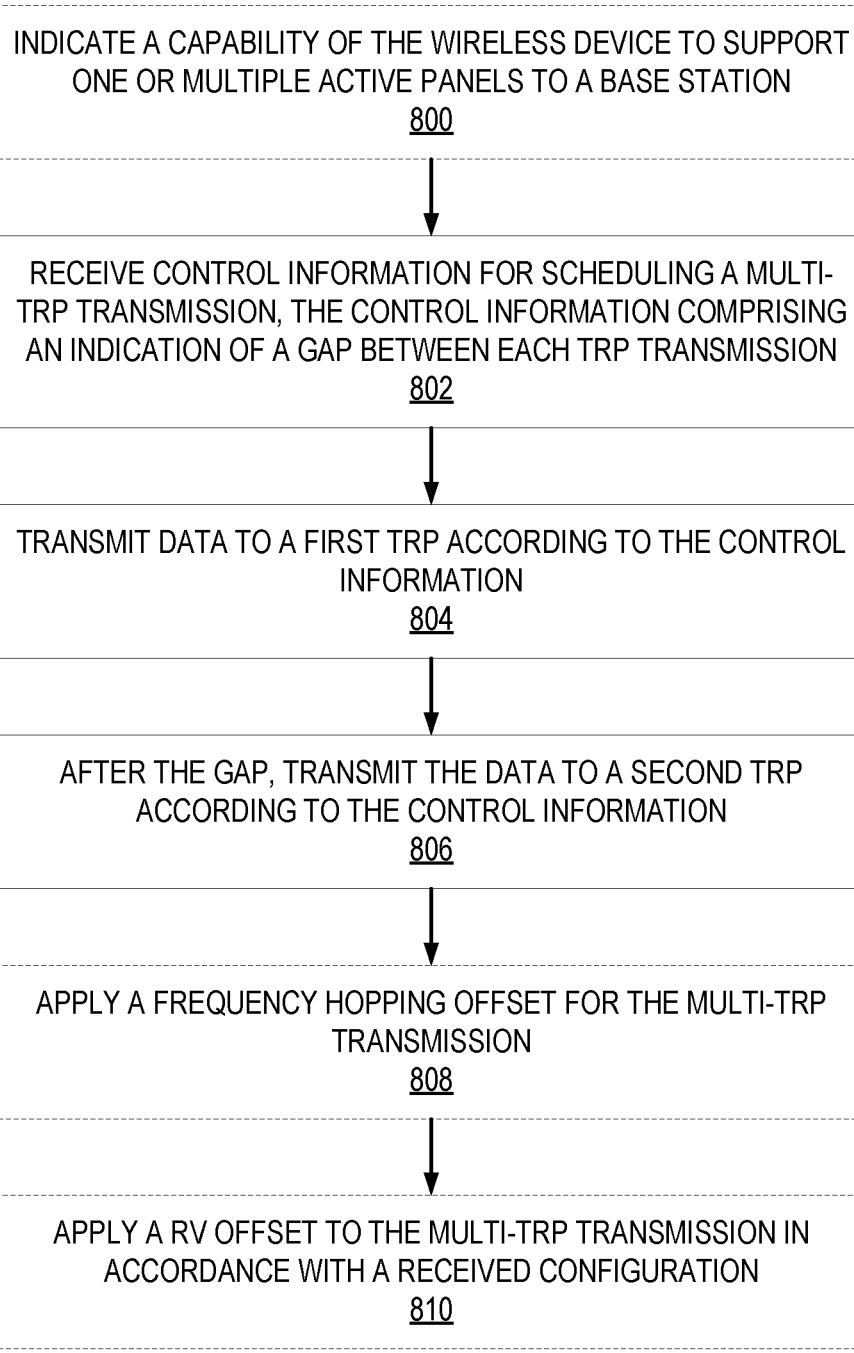
FIG. 8 is a flowchart illustrating a method for transmitting to multiple TRPs, in accordance with one embodiment.

FIG. 8 is a flowchart illustrating a method for transmitting data to multiple TRPs, in accordance with one embodiment. The method may be implemented in a wireless device. Optional steps are indicated with dashed lines. In optional step 800, the wireless device indicates a capability of the wireless device to support one or multiple active panels to a base station. In step 802, the wireless device receives control information for scheduling a multi-TRP transmission, the control information comprising an indication of a gap between each TRP transmission. In step 804, the wireless device transmits the data to a first TRP according to the control information. In step 806, after the gap, the wireless device transmits the data (e.g., the same data) to a second TRP according to the control information. In optional step 808, the wireless device applies a frequency hopping offset for the multi-TRP transmission (e.g., received via DCI). In tion, the network node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a network node 1000 as described herein. In some embodiments, the function(s) are implemented in software that is stored, e.g., in the memory 1006 and executed by the one or more processors 1004.

Figure 11:
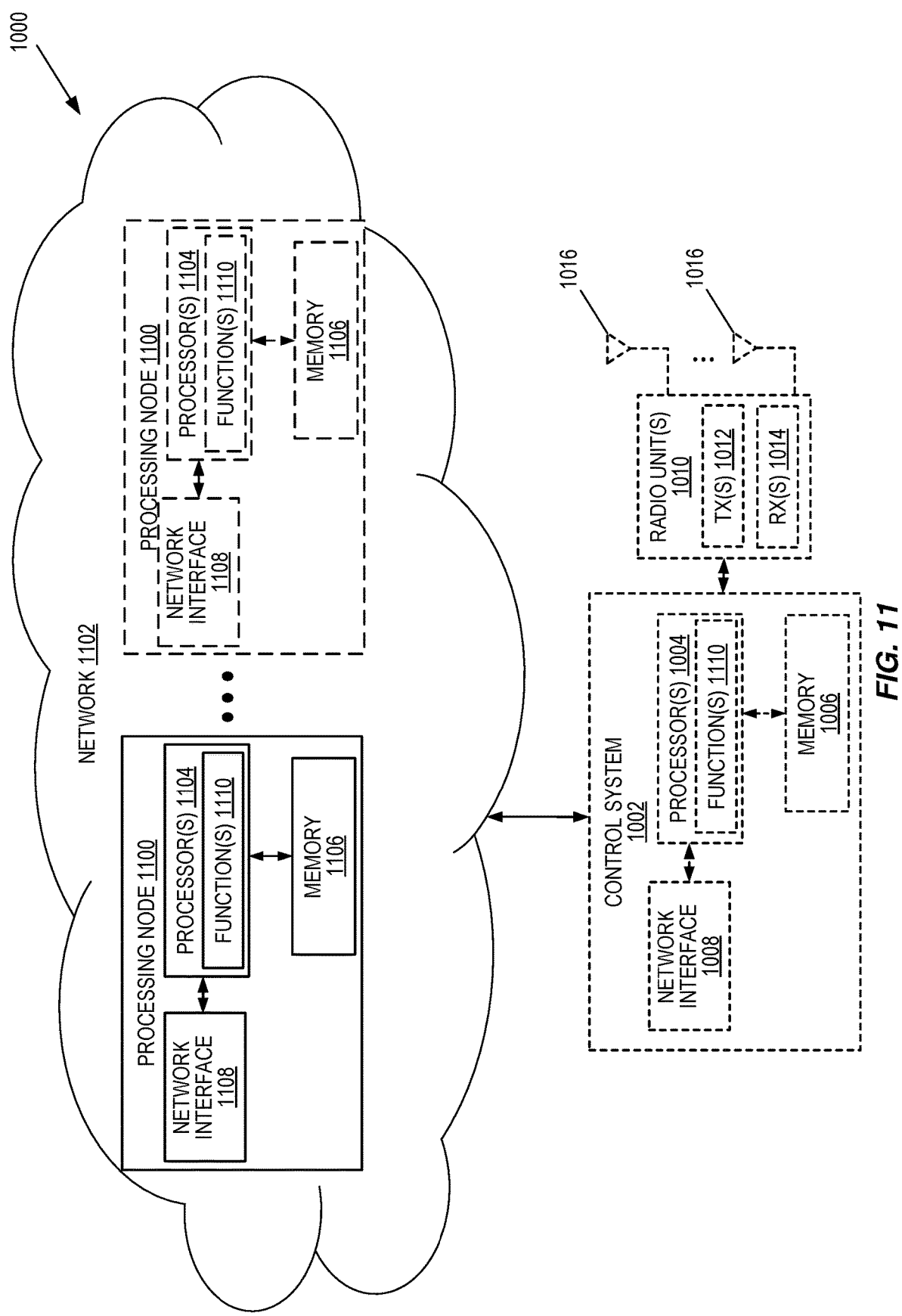
FIG. 11 is a schematic block diagram that illustrates a virtualized embodiment of the network node according to some embodiments of the present disclosure.

FIG. 11 is a schematic block diagram that illustrates a virtualized embodiment of the network node 1000 according to some embodiments of the present disclosure. This discussion is equally applicable to a radio access node or other types of network nodes. Further, other types of network nodes may have similar virtualized architectures. Again, optional features are represented by dashed boxes.

As used herein, a "virtualized" network node is an implementation of the network node 1000 in which at least a portion of the functionality of the network node 1000 is implemented as a virtual component(s) (e.g., via a virtual machine(s) executing on a physical processing node(s) in a network(s)). As illustrated, in this example, the network node 1000 may include the control system 1002 and/or the one or more radio units 1010, as described above. The control system 1002 may be connected to the radio unit(s) 1010 via, for example, an optical cable or the like. The network node 1000 includes one or more processing nodes 1100 coupled to or included as part of a network(s) 1102. If present, the control system 1002 or the radio unit(s) 1010 are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the network node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the network node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of network node 1000 or a node (e.g., a processing node 1100) implementing one or more of the functions 1110 of the network node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
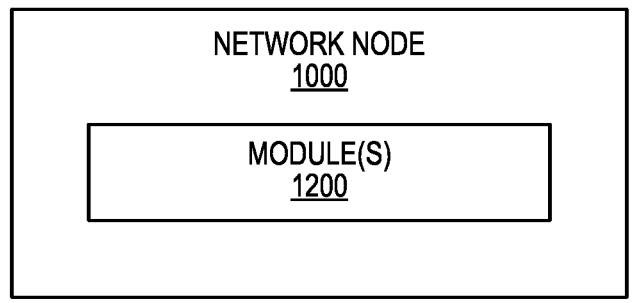
FIG. 12 is a schematic block diagram of the network node according to some other embodiments of the present disclosure.

FIG. 12 is a schematic block diagram of the network node 1000 according to some other embodiments of the present disclosure. The network node 1000 includes one or more modules 1200, each of which is implemented in software. The module(s) 1200 provide the functionality of the network node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
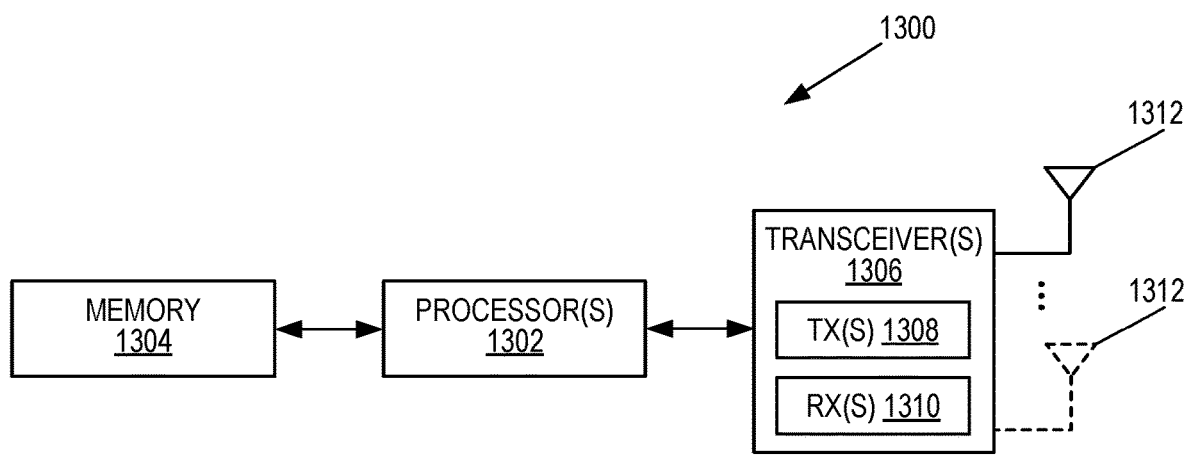
FIG. 13 is a schematic block diagram of a wireless communication device according to some embodiments of the present disclosure.

FIG. 13 is a schematic block diagram of a wireless communication device 1300 according to some embodiments of the present disclosure. As illustrated, the wireless communication device 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the wireless communication device 1300 described above may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
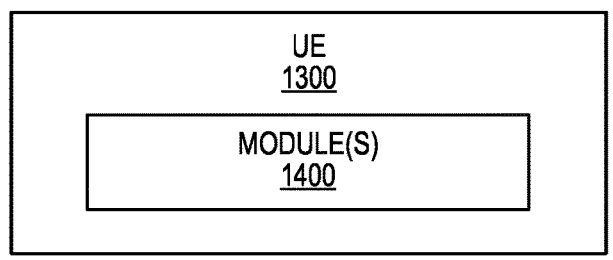
FIG. 14 is a schematic block diagram of the wireless communication device according to some other embodiments of the present disclosure.

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may per-

Group A Embodiments

Embodiment 1: A method performed by a wireless device for transmitting to multiple TRPs, the method comprising at least one of: receiving control information for scheduling a multi-TRP transmission, the control information comprising an indication of a gap between each TRP transmission; transmitting to a first TRP according to the control information; and after the gap, transmitting to a second TRP according to the control information.

Embodiment 2: The method of embodiment 1, further comprising indicating a capability of the wireless device to support one or multiple active panels to a base station prior to receiving the control information.

Embodiment 3: The method of any of embodiments 1 to 2, wherein: the control information is received through a DCI message from a base station; and the gap is indicated in a TDRA field of the DCI message.

Embodiment 4: The method of embodiment 3, wherein the multi-TRP transmission is configured with PUSCH repetition Type B.

Embodiment 5: The method of embodiment 4, wherein: the wireless device supports multiple panel transmission; and at least one of the fields in the DCI message indicates more than one TRP transmission.

Embodiment 6: The method of any of embodiments 1 to 5, wherein the gap is indicated as a minimum number of symbols in which the wireless device is not scheduled to transmit or receive over a shared channel between transmitting to the first TRP and transmitting to the second TRP.

Embodiment 7: The method of embodiment 6, wherein the symbols comprising the gap after transmitting to the first TRP are treated as DL symbols or invalid symbols.

Embodiment 8: The method of embodiment 7, wherein if the symbols comprising the gap are in a resource block indicated for transmission to the second TRP, transmitting to the second TRP on remaining symbols of the resource block.

Embodiment 9: The method of any of embodiments 1 to 5, wherein the gap is indicated as a number of symbols after beginning to transmit to the first TRP before beginning to transmit to the second TRP.

Embodiment 10: The method of any of embodiments 1 to 9, wherein the gap is implicitly indicated by using TDRA for a shared channel repetition associated with the multi-TRP transmission.

Embodiment 11: The method of any of embodiments 1 to 10, wherein the gap is configured by a higher layer.

Embodiment 12: The method of any of embodiments 1 to 11, wherein K repetitions are configured for a PUSCH used for the multi-TRP transmission.

Embodiment 13: The method of embodiment 12, wherein the configured repetitions K are applied for each TRP of the multi-TRP transmission.

Embodiment 14: The method of embodiment 12, wherein the configured repetitions K are distributed among the first TRP and the second TRP.

Embodiment 15: The method of embodiment 12, wherein one transmission is made per TRP of the multi-TRP transmission in order and repeats until the configured repetitions K are reached.

Embodiment 16: The method of any of embodiments 1 to 15, wherein the control information further comprises a flag enabling frequency hopping for the multi-TRP transmission.

Embodiment 17: The method of embodiment 16, wherein the control information indicates a frequency hopping offset applied on all TRPs of the multi-TRP transmission.

Embodiment 18: The method of embodiment 16, wherein a frequency hopping offset is associated with resource allocation for TRPs of the multi-TRP transmission and indicated by higher layer configuration.

Embodiment 19: The method of any of the previous embodiments, further comprising: providing user data; and forwarding the user data to a host computer via a transmission to a base station.

Group B Embodiments

Embodiment 20: A method performed by a base station for facilitating transmission to multiple TRPs, the method comprising at least one of: receiving an indication of a capability of a UE to support one or multiple active panels; scheduling a multi-TRP transmission by the UE based on the indication of the capability; and sending control information for the multi-TRP transmission to the UE, the control information comprising an indication of a gap between each TRP transmission.

Embodiment 21: The method of embodiment 20, wherein: the control information is transmitted through a DCI message; and the gap is indicated in a TDRA field of the DCI message.

Embodiment 22: The method of embodiment 21, further comprising configuring the multi-TRP transmission with PUSCH repetition Type B.

Embodiment 23: The method of embodiment 22, wherein: the UE has the capability to support multiple active panels; and at least one of the fields in the DCI message indicates more than one TRP transmission.

Embodiment 24: The method of any of embodiments 20 to 23, further comprising not scheduling the UE to transmit or receive over a shared channel during the gap between each TRP transmission.

Embodiment 25: The method of any of embodiments 20 to 24, further comprising configuring K repetitions for a PUSCH used for the multi-TRP transmission.

Embodiment 26: The method of any of embodiments 20 to 25, further comprising enabling frequency hopping for the multi-TRP transmission.

Embodiment 27: The method of embodiment 26, further comprising providing a frequency hopping offset to the UE.

Embodiment 28: The method of any of the previous embodiments, further comprising: obtaining user data; and forwarding the user data to a host computer or a wireless device.

Group C Embodiments

Embodiment 29: A wireless device for transmitting to multiple TRPs, the wireless device comprising: processing circuitry configured to perform any of the steps of any of the Group A embodiments; and power supply circuitry configured to supply power to the wireless device.

Embodiment 30: A base station for facilitating transmission to multiple TRPs, the base station comprising: processing circuitry configured to perform any of the steps of any of the Group B embodiments; and power supply circuitry configured to supply power to the base station.

Embodiment 31: A UE for transmitting to multiple TRPs, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 32: A communication system including a host computer comprising: processing circuitry configured to provide user data; and a communication interface configured to forward the user data to a cellular network for transmission to a UE; wherein the cellular network comprises a base station having a radio interface and processing circuitry, the base station's processing circuitry configured to perform any of the steps of any of the Group B embodiments.

Embodiment 33: The communication system of the previous embodiment further including the base station.

Embodiment 34: The communication system of the previous 2 embodiments, further including the UE, wherein the UE is configured to communicate with the base station.

Embodiment 35: The communication system of the previous 3 embodiments, wherein: the processing circuitry of the host computer is configured to execute a host application, thereby providing the user data; and the UE comprises processing circuitry configured to execute a client application associated with the host application.

Embodiment 36: A method implemented in a communication system including a host computer, a base station, and a UE, the method comprising: at the host computer, providing user data; and at the host computer, initiating a transmission carrying the user data to the UE via a cellular network comprising the base station, wherein the base station performs any of the steps of any of the Group B embodiments.

Embodiment 37: The method of the previous embodiment, further comprising, at the base station, transmitting the user data.

Embodiment 38: The method of the previous 2 embodiments, wherein the user data is provided at the host computer by executing a host application, the method further comprising, at the UE, executing a client application associated with the host application.

Embodiment 39: A UE configured to communicate with a base station, the UE comprising a radio interface and processing circuitry configured to perform the method of the previous 3 embodiments.

Embodiment 40: A communication system including a host computer comprising: processing circuitry configured to provide user data; and a communication interface configured to forward user data to a cellular network for transmission to a UE; wherein the UE comprises a radio interface and processing circuitry, the UE's components configured to perform any of the steps of any of the Group A embodiments.

Embodiment 41: The communication system of the previous embodiment, wherein the cellular network further includes a base station configured to communicate with the UE.

Embodiment 42: The communication system of the previous 2 embodiments, wherein: the processing circuitry of the host computer is configured to execute a host application, thereby providing the user data; and the UE's processing circuitry is configured to execute a client application associated with the host application.

Embodiment 43: A method implemented in a communication system including a host computer, a base station, and a UE, the method comprising: at the host computer, providing user data; and at the host computer, initiating a transmission carrying the user data to the UE via a cellular network comprising the base station, wherein the UE performs any of the steps of any of the Group A embodiments.

Embodiment 44: The method of the previous embodiment, further comprising at the UE, receiving the user data from the base station.

Embodiment 45: A communication system including a host computer comprising: a communication interface configured to receive user data originating from a transmission from a UE to a base station; wherein the UE comprises a radio interface and processing circuitry, the UE's processing circuitry configured to perform any of the steps of any of the Group A embodiments.

Embodiment 46: The communication system of the previous embodiment, further including the UE.

Embodiment 47: The communication system of the previous 2 embodiments, further including the base station, wherein the base station comprises a radio interface configured to communicate with the UE and a communication interface configured to forward to the host computer the user data carried by a transmission from the UE to the base station.

Embodiment 48: The communication system of the previous 3 embodiments, wherein: processing circuitry of the host computer is configured to execute a host application; and the UE's processing circuitry is configured to execute a client application associated with the host application, thereby providing the user data.

Embodiment 49: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 50: A method implemented in a communication system including a host computer, a base station, and a UE, the method comprising: at the host computer, receiving user data transmitted to the base station from the UE, wherein the UE performs any of the steps of any of the Group A embodiments.

Embodiment 51: The method of the previous embodiment, further comprising, at the UE, providing the user data to the base station.

Embodiment 52: The method of the previous 2 embodiments, further comprising: at the UE, executing a client application, thereby providing the user data to be transmitted; and at the host computer, executing a host application associated with the client application.

Embodiment 53: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 54: A communication system including a host computer comprising a communication interface configured to receive user data originating from a transmission from a UE to a base station, wherein the base station comprises a radio interface and processing circuitry, the base station's processing circuitry configured to perform any of the steps of any of the Group B embodiments.

Embodiment 55: The communication system of the previous embodiment further including the base station.

Embodiment 56: The communication system of the previous 2 embodiments, further including the UE, wherein the UE is configured to communicate with the base station.

Embodiment 57: The communication system of the previous 3 embodiments, wherein: processing circuitry of the host computer is configured to execute a host application; and the UE is configured to execute a client application associated with the host application, thereby providing the user data to be received by the host computer.

Embodiment 58: A method implemented in a communication system including a host computer, a base station, and a UE, the method comprising: at the host computer, receiving, from the base station, user data originating from a transmission which the base station has received from the UE, wherein the UE performs any of the steps of any of the Group A embodiments.

Embodiment 59: The method of the previous embodiment, further comprising at the base station, receiving the user data from the UE.

Embodiment 60: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Management Function
ASIC Application Specific Integrated Circuit
AUSF Authentication Server Function
BWP Bandwidth Part
CG Configured Grant
CP-OFDM Cyclic Prefix Orthogonal Frequency Division Multiplexing
CPU Central Processing Unit
C-RNTI Cell Radio Network Temporary Identifier
CRC Cyclic Redundancy Check
CSI-RS Channel State Information Reference Signal
CS-RNTI Configured Scheduling Radio Network Temporary Identifier
DCI Downlink Control Information
DFT Discrete Fourier Transform
DL Downlink
DMRS Demodulation Reference Signal
DSP Digital Signal Processor
eNB Enhanced or Evolved Node B
EPC Evolved Packet Core
EPS Evolved Packet System
E-UTRA Evolved Universal Terrestrial Radio Access
FDD Frequency-Domain Duplexing
FPGA Field Programmable Gate Array
gNB New Radio Base Station
gNB-CU New Radio Base Station Central Unit
gNB-DU New Radio Base Station Distributed Unit
HSS Home Subscriber Server
IE Information Element
IoT Internet of Things
LTE Long Term Evolution
MCS-C-RNTI Modulation Coding Scheme Cell Radio Network Temporary Identifier
MIMO Multiple-Input Multiple-Output
MME Mobility Management Entity
MTC Machine Type Communication
NDI New Data Indicator
NEF Network Exposure Function
NF Network Function
NR New Radio
NRF Network Function Repository Function
NSSF Network Slice Selection Function
NZP Non-Zero Power
OFDM Orthogonal Frequency Division Multiplexing
PC Personal Computer
PCF Policy Control Function
PDCCH Physical Downlink Control Channel
PDSCH Physical Downlink Shared Channel
P-GW Packet Data Network Gateway
PUSCH Physical Uplink Shared Channel
RAM Random Access Memory
RAN Radio Access Network
RB Resource Block
RE Resource Element
ROM Read Only Memory
RRC Radio Resource Control
RRH Remote Radio Head
RS Reference Signal
RV Redundancy Version
RX Receive
SCEF Service Capability Exposure Function
SLIV Start and Length Indicator Values
SMF Session Management Function
SRS Sounding Reference Signal
SSB Synchronization Signal Block
TB Transport Block
TCI Transmission Configuration Information
TDD Time-Domain Duplexing
TDRA Time-Domain Resource Allocation
TPMI Transmit Precoding Matrix Indicator
TRP Transmission/Reception Point
TX Transmit
UDM Unified Data Management
UE User Equipment
UL Uplink
UPF User Plane Function
URLLC Ultra-Reliable Low-Latency Communication Those skilled in the art will recognize improvements and modifications to the embodiments of the present disclosure. All such improvements and modifications are considered within the scope of the concepts disclosed herein.

The invention claimed is:

1. A method performed by a wireless device for transmitting data to multiple Transmission/Reception Points, TRPs, the method comprising:
receiving control information for scheduling a multi-TRP transmission, the control information comprising an indication of a gap between each TRP transmission and a redundancy version identifier;
transmitting the data to a first TRP according to the control information;
after the gap, transmitting the data to a second TRP according to the control information; and
applying a Redundancy Version, RV, offset to the multi-TRP transmission in accordance with a received configuration;

wherein:
a redundancy version applied to the data transmitted to the first TRP is in accordance with the redundancy version identifier comprised in the control information; and
a redundancy version applied to the data transmitted to the second TRP is in accordance with the redundancy version identifier comprised in the control information and the RV offset.

2. The method of claim 1, wherein each TRP is characterized by a reference signal transmitted from the TRP and previously received by the wireless device or previously transmitted from the wireless device to the TRP, and is indicated to the wireless device by a spatial relation comprising the reference signal or a Transmission Configuration Information, TCI, state comprising the reference signal.

3. The method of claim 1, further comprising indicating a capability of the wireless device to support one or multiple active panels to a network node prior to receiving the control information.

4. The method of claim 1, wherein:
the control information is received through a Downlink Control Information, DCI, message from a network node; and
the gap is indicated in a Time Domain Resource Allocation, TDRA, field of the DCI message.

5. The method of claim 4, wherein the multi-TRP transmission is configured with Physical Uplink Shared Channel, PUSCH, repetition Type B.

6. The method of claim 5, wherein:
the wireless device supports multiple panel transmission; and
at least one field in the DCI message indicates more than one TRP transmission.

7. The method of claim 1, wherein the gap is indicated as a minimum number of symbols in which the wireless device is not scheduled to transmit or receive over a shared channel between transmitting to the first TRP and transmitting to the second TRP.

8. The method of claim 7, wherein the symbols comprising the gap after transmitting to the first TRP are treated as downlink symbols or invalid symbols.

9. The method of claim 8, further comprising, if the symbols comprising the gap are in a resource block indicated for transmission to the second TRP, transmitting to the second TRP on remaining symbols of the resource block.

10. The method of claim 1, wherein the gap is indicated as a number of symbols after beginning to transmit to the first TRP before beginning to transmit to the second TRP.

11. The method of claim 1, wherein the gap is implicitly indicated by using Time Domain Resource Allocation, TDRA, for a shared channel repetition associated with the multi-TRP transmission.

12. The method of claim 1, wherein the gap is configured by a higher layer.

13. The method of claim 1, wherein K repetitions are configured for a Physical Uplink Shared Channel, PUSCH, used for the multi-TRP transmission.

14. The method of claim 13, wherein the configured repetitions K are applied for each TRP of the multi-TRP transmission.

15. The method of claim 13, wherein the configured repetitions K are distributed among the first TRP and the second TRP.

16. The method of claim 13, wherein one transmission is made per TRP of the multi-TRP transmission in order and repeats until the configured repetitions K are reached.

17. The method of claim 1, wherein the control information further comprises a flag enabling frequency hopping for the multi-TRP transmission.

18. The method of claim 17, further comprising applying a frequency hopping offset indicated by the control information on all TRPs of the multi-TRP transmission.

19. The method of claim 17, further comprising applying a frequency hopping offset, wherein the control information indicates a single resource allocation for all TRPs of the multi-TRP transmission and the frequency hopping offset is configured by higher layers.

20. The method of claim 19, wherein:
the frequency hopping occurs within a transmission to each TRP; and
transmitting to the second TRP occurs after frequency hopping within the transmission to the first TRP and after the gap.

21. The method of claim 19, wherein:
the frequency hopping occurs between transmissions to a same TRP; and
the method further comprises transmitting to the first TRP using the frequency hopping offset after transmitting to the second TRP and after another gap.

22. The method of claim 1, wherein the redundancy version identifier comprised in the control information indicates a first RV for a first repetition to the first TRP.

23. The method of claim 22, wherein a second RV for a first repetition to the second TRP is given by applying the RV offset to the first RV.

24. The method of claim 22, wherein the RV offset is configured by Radio Resource Control, RRC, and applied according to the following table:

| $rv_{id}$ indicated by the DCI scheduling the PUSCH | $rv_{id}$ to be applied to nth transmission occasion (repetition Type A) or nth actual repetition (repetition Type B) | | | |
| --- | --- | --- | --- | --- |
| | n mod 4 = 0 | n mod 4 = 1 | n mod 4 = 2 | n mod 4 = 3 |
| 0 | $(0 + rv_{UL,s})$ mod 4 | $(2 + rv_{UL,s})$ mod 4 | $(3 + rv_{UL,s})$ mod 4 | $(1 + rv_{UL,s})$ mod 4 |
| 2 | $(2 + rv_{UL,s})$ mod 4 | $(3 + rv_{UL,s})$ mod 4 | $(1 + rv_{UL,s})$ mod 4 | $(0 + rv_{UL,s})$ mod 4 |
| 3 | $(3 + rv_{UL,s})$ mod 4 | $(1 + rv_{UL,s})$ mod 4 | $(0 + rv_{UL,s})$ mod 4 | $(2 + rv_{UL,s})$ mod 4 |
| 1 | $(1 + rv_{UL,s})$ mod 4 | $(0 + rv_{UL,s})$ mod 4 | $(2 + rv_{UL,s})$ mod 4 | $(3 + rv_{UL,s})$ mod 4 | where $rv_{id}$ refers to the first RV, $rv_{UL,s}$ refers to the RV offset, and DCI refers to a Downlink Control Information message where the control information is received.

25. A method performed by a network node for facilitating transmission to multiple Transmission/Reception Points, TRPs, the method comprising:
receiving an indication of a capability of a User Equipment, UE, to support one or multiple active panels;

scheduling a multi-TRP transmission by the UE based on the indication of the capability;

sending control information for the multi-TRP transmission to the UE, the control information comprising an indication of a gap between each TRP transmission and a redundancy version identifier; and configuring a Redundancy Version, RV, offset for the multi-TRP transmission; and wherein:
a redundancy version to be applied to data transmitted by the UE to the first TRP is in accordance with the redundancy version identifier comprised in the control information; and a redundancy version to be applied to data transmitted by the UE to the second TRP is in accordance with the redundancy version identifier comprised in the control information and the RV offset.

26. The method of claim 25, wherein:
the control information is transmitted through a Downlink Control Information, DCI, message; and
the gap is indicated in a Time Domain Resource Allocation, TDRA, field of the DCI message.

27. The method of claim 26, further comprising configuring the multi-TRP transmission with Physical Uplink Shared Channel, PUSCH, repetition Type B.

28. The method of claim 27, wherein:
the UE has the capability to support multiple active panels; and
at least one field in the DCI message indicates more than one TRP transmission.

29. The method of claim 25, further comprising not scheduling the UE to transmit or receive over a shared channel during the gap between each TRP transmission.

30. The method of claim 25, further comprising configuring K repetitions for a Physical Uplink Shared Channel, PUSCH, used for the multi-TRP transmission.

31. The method of claim 25, further comprising enabling frequency hopping for the multi-TRP transmission.

32. The method of claim 31, further comprising providing a frequency hopping offset to the UE.

33. The method of claim 25, further comprising:
signaling the RV offset to the UE with a Radio Resource Control, RRC, message; and
wherein sending the control information for the multi-TRP transmission to the UE comprises signaling the redundancy version identifier, which indicates a first RV, to the UE through a Downlink Control Information, DCI, message comprising the control information for the multi-TRP transmission.

* * * * *